(12) United States Patent
Kubo et al.

(10) Patent No.: US 7,762,614 B2
(45) Date of Patent: Jul. 27, 2010

(54) GLASS RUN

(75) Inventors: Yoshihisa Kubo, Aichi-ken (JP);
Atsushi Sumida, Aichi-ken (JP);
Tatsuhiko Nagata, Aichi-ken (JP);
Soichiro Yamamoto, Aichi-ken (JP);
Tamotsu Watanabe, Aichi-ken (JP);
Masatoshi Hotta, Aichi-ken (JP)

(73) Assignee: Toyoda Gosei Co., Ltd., Nishikasugai-gun, Aichi-ken (JP)

( * ) Notice: Subject to any disclaimer, the term of this patent is extended or adjusted under 35 U.S.C. 154(b) by 260 days.

(21) Appl. No.: 11/905,075

(22) Filed: Sep. 27, 2007

(65) Prior Publication Data

US 2008/0084088 A1    Apr. 10, 2008

(30) Foreign Application Priority Data

| Sep. 28, 2006 | (JP) | ............................ P2006-264770 |
| Sep. 28, 2006 | (JP) | ............................ P2006-264771 |
| Nov. 28, 2006 | (JP) | ............................ P2006-319537 |
| Nov. 28, 2006 | (JP) | ............................ P2006-319538 |
| Dec. 14, 2006 | (JP) | ............................ P2006-336642 |

(51) Int. Cl.
*B60J 10/02* (2006.01)

(52) U.S. Cl. ..................................... 296/146.2; 49/441

(58) Field of Classification Search ............. 296/146.2, 296/146.9, 146.1; 49/441, 479.1, 428
See application file for complete search history.

(56) References Cited

U.S. PATENT DOCUMENTS

| 4,704,820 | A | * | 11/1987 | Kisanuki | ...................... 49/441 |
| 4,897,298 | A | * | 1/1990 | Otawa et al. | ................. 428/122 |
| 4,920,699 | A | * | 5/1990 | Nagata et al. | .................. 49/441 |
| 5,007,202 | A | * | 4/1991 | Guillon | ....................... 49/441 |
| 5,010,689 | A | * | 4/1991 | Vaughan | ....................... 49/440 |
| 5,183,613 | A | * | 2/1993 | Edwards | ................. 264/173.19 |
| 5,195,273 | A | * | 3/1993 | Yamano et al. | ............... 49/441 |
| 5,265,377 | A | * | 11/1993 | Iwasa et al. | .................... 49/441 |
| 5,345,718 | A | | 9/1994 | Dupuy | |
| 5,365,698 | A | * | 11/1994 | Nozaki | ......................... 49/441 |

(Continued)

FOREIGN PATENT DOCUMENTS

JP    2000-185558    7/2000

(Continued)

OTHER PUBLICATIONS

Chinese Office Action dated Jun. 5, 2009, with English translation.

*Primary Examiner*—Kiran B. Patel
(74) *Attorney, Agent, or Firm*—McGinn IP Law Group, PLLC

(57) ABSTRACT

A glass run includes a main body portion and a pair of seal lips. Further, the glass run is constituted by a vehicle exterior side molded member and a vehicle interior side molded member divided at a bottom portion of the main body portion. Further, the vehicle exterior side molded member and the vehicle interior side molded member include engaging portions for engaging to be integrated with each other. By integrating the vehicle exterior side molded member and the vehicle interior side molded member by the engaging portions, the vehicle exterior side molded member is restricted from being shifted to move relative to the vehicle interior side molded member in a vehicle width direction and in a longitudinal direction of the vehicle interior side molded member.

5 Claims, 27 Drawing Sheets

U.S. PATENT DOCUMENTS

| | | | |
|---|---|---|---|
| 5,396,733 A | 3/1995 | Dupuy | |
| 5,414,961 A * | 5/1995 | Tessier | 49/441 |
| 5,461,830 A | 10/1995 | Dupuy | |
| 5,503,700 A | 4/1996 | Dupuy | |
| 6,115,969 A * | 9/2000 | Nozaki | 49/479.1 |
| 6,138,414 A * | 10/2000 | Ohmori et al. | 49/441 |
| 6,185,869 B1 * | 2/2001 | Kawai | 49/441 |
| 6,213,536 B1 * | 4/2001 | Raisch et al. | 296/146.9 |
| 6,389,754 B2 * | 5/2002 | Nozaki | 49/441 |
| 6,412,226 B1 * | 7/2002 | Nozaki et al. | 49/441 |
| 6,430,878 B2 * | 8/2002 | Terasawa et al. | 49/416 |
| 6,451,411 B1 * | 9/2002 | Riley | 428/156 |
| 6,493,992 B2 * | 12/2002 | Goto | 49/441 |
| 6,668,488 B2 * | 12/2003 | Nozaki et al. | 49/441 |
| 6,708,450 B2 * | 3/2004 | Tanaka et al. | 49/441 |
| 7,055,285 B2 * | 6/2006 | Nozaki | 49/479.1 |
| 7,069,697 B2 * | 7/2006 | Hamada et al. | 49/428 |
| 7,294,386 B2 * | 11/2007 | Murase et al. | 428/99 |
| 7,383,662 B2 * | 6/2008 | Tamaoki | 49/441 |
| 7,390,049 B2 * | 6/2008 | Nishikawa | 296/146.1 |
| 7,410,203 B2 * | 8/2008 | Yatsuda et al. | 296/146.2 |
| 7,487,615 B2 * | 2/2009 | Watanabe et al. | 49/441 |
| 7,513,079 B2 * | 4/2009 | Nozaki et al. | 49/506 |
| 2002/0001696 A1 * | 1/2002 | Kozawa et al. | 428/156 |
| 2005/0095397 A1 * | 5/2005 | Omori et al. | 428/122 |
| 2005/0120633 A1 * | 6/2005 | Takase et al. | 49/441 |
| 2005/0229495 A1 * | 10/2005 | Murase et al. | 49/428 |
| 2006/0248802 A1 * | 11/2006 | Tamaoki et al. | 49/441 |
| 2007/0271853 A1 * | 11/2007 | Yatsuda et al. | 49/489.1 |
| 2008/0172948 A1 * | 7/2008 | Shibata et al. | 49/440 |
| 2009/0039672 A1 * | 2/2009 | Kubo et al. | 296/146.2 |
| 2009/0064592 A1 * | 3/2009 | Takase et al. | 49/374 |
| 2009/0071077 A1 * | 3/2009 | Takase et al. | 49/489.1 |
| 2009/0108625 A1 * | 4/2009 | Minami et al. | 296/146.2 |
| 2009/0241431 A1 * | 10/2009 | Shibata et al. | 49/490.1 |

FOREIGN PATENT DOCUMENTS

| | | |
|---|---|---|
| JP | 2006-8045 | 1/2006 |

* cited by examiner

GLASS RUN

BACKGROUND OF THE INVENTION

1. Field of the Invention

The present invention relates to a glass run.

2. Related Art

Generally, a glass run is provided along an inner periphery of a door frame of an automobile. When the glass run is viewed from a direction of a section thereof, the glass run includes a main body portion having a section in a U-shape comprising a based bottom portion and a vehicle interior side wall portion and a vehicle exterior side wall portion extended from the bottom portion and is provided with a vehicle interior side seal lip and a vehicle exterior side seal lip extended to an inner side of the main body portion. According to the glass run, the main body portion is attached to an attaching portion (channel portion) provided along the inner periphery of the door frame, and peripheral edge portions of inner and outer faces of door glass are sealed by the two seal lips to be pinched thereby.

Further, the glass run is constituted by an extruded portion formed substantially in a linear shape and a molded portion for connecting the extruded portions in a state of making a predetermined angle therebetween, and comprises, for example, a front vertical side portion, an upper side portion and a rear vertical side portion along a shape of the door frame (refer to, for example, JP-A-2006-8045).

Meanwhile, when the glass run is constituted by the extruded portion and the molded portion, a line of connecting the extruded portion and the molded portion appears in an appearance and there is a concern of deteriorating an appearance quality by being caused thereby. Further, there is also a case in which materials of constituting the extruded portion and the molded portion differ from each other, by which colors/glazes of surfaces thereof differ from each other considerably. Also by difference in the colors/glazes, there is a concern of deteriorating the appearance quality. Further, a stepped difference is liable to be formed at a boundary portion (connecting portion) of the extruded portion and the molded portion and there is a concern of deteriorating a sealing performance.

Further, in molding, it is necessary to put a mold (core) for molding respective inner peripheral faces of the main body portion, the vehicle interior side seal lip, and the vehicle exterior side seal lip to the molding portion forming a corner portion of the glass run, and it is general to mold the vehicle interior side wall portion and the vehicle exterior side wall portion by a developed shape of opening the side wall portions in order to maintain a strength of holding the core. However, when the vehicle interior side wall portion and the vehicle exterior side wall portion are deformed to narrow in being attached to the attaching portion, there is a concern of changing a bending angle or the like of the molded portion (corner portion). In this case, a total shape of the glass run cannot follow a shape of the attaching portion and there is a concern of deteriorating a state of being attached to the attaching portion.

Further, it is also proposed to mold a glass run dividedly to a vehicle interior side constituting member and a vehicle exterior side constituting member, thereafter, integrally combining the two constituting members (refer to, for example, U.S. Pat. No. 5,396,733).

However, according to the glass run described in U.S. Pat. No. 5,396,733, in combining the two constituting members, there is not a restriction for a shift in a width direction and a longitudinal direction of the two constituting members when the two constituting members are combined, and therefore, it is difficult to precisely combine the two constituting members over an entire region thereof, depending on cases, there is a concern of deteriorating a sealing performance or deteriorating a state of being attached to an attaching portion.

SUMMARY OF THE INVENTION

The invention has been carried out in view of the above-described situation and it is an object thereof to provide a glass run capable of promoting an appearance quality, promoting a sealing performance, stabilizing an attaching state and the like.

The invention provides a glass run including a main body portion attached to an attaching portion provided along an inner periphery of a door frame of a vehicle, comprising a bottom portion and a vehicle interior side wall portion and a vehicle exterior side wall portion extended from the bottom portion and constituting a section substantially in a U-shape, and a vehicle interior side seal lip and a vehicle exterior side seal lip extended from tip ends of the vehicle interior side wall portion and the vehicle exterior side wall portion to an inner side of the main body portion;

wherein a vehicle interior side molded member and a vehicle exterior side molded member are constituted by dividing the main body portion to a vehicle interior side and a vehicle exterior side at any portion thereof;

wherein the vehicle interior side molded member and the vehicle exterior side molded member include engaging portions for engaging to be integrated with each other; and wherein the vehicle exterior side molded member is restricted from being shifted to move relative to the vehicle interior side molded member in a vehicle width direction and in a longitudinal direction of the vehicle interior side molded member to thereby constitute an entire region in a longitudinal direction comprising an upper side portion in correspondence with an upper edge portion of door glass and a front vertical side portion and a rear vertical side portion in correspondence with a front edge portion and a rear edge portion of the door glass.

According to the invention, the entire region in the longitudinal direction of the glass run is constituted by the vehicle interior side molded member and the vehicle exterior side molded member. That is, the glass run can be constituted only by a molded member. Therefore, there can be avoided a situation that a line of connecting an extruded member and a molded member appears in an appearance as in, for example, a case of constituting a glass run by the extruded member and the molded member. Further, there can be avoided a situation that a difference is brought about in color/glaze partially in the longitudinal direction (peripheral direction) of the glass run. As a result, an appearance quality is promoted. Further, a concern that a stepped difference is formed in the longitudinal direction of the glass run can be avoided and a sealing performance is promoted.

Further, since the glass run is constituted by the vehicle interior side molded member and the vehicle exterior side molded member which are subjected to molding separately from each other, there can be constituted a shape by which it is not necessary to mold the glass run to constitute a developed shape for considerably widening the vehicle interior side wall portion and the vehicle exterior side wall portion and it is not necessary to considerably deform the sectional shape in being attached to the attaching portion. Therefore, a state of attaching the glass run to the attaching portion can be stabilized (sealing performance is promoted) or the like. Further, a molded member is provided with a degree of freedom of a product design hither than that of an extruded member, and therefore, even when the sectional shape is made to differ at a particular portion (for example, providing a projection, shortening a seal lip or the like), the particular portion can easily be molded by molding. Therefore, there can be avoided a situation that an operation (step) is separately needed in order to make the positional shape differ at the particular portion and a productivity is promoted.

DETAILED DESCRIPTION OF THE PREFERRED EMBODIMENTS

First Embodiment

Figure 1:
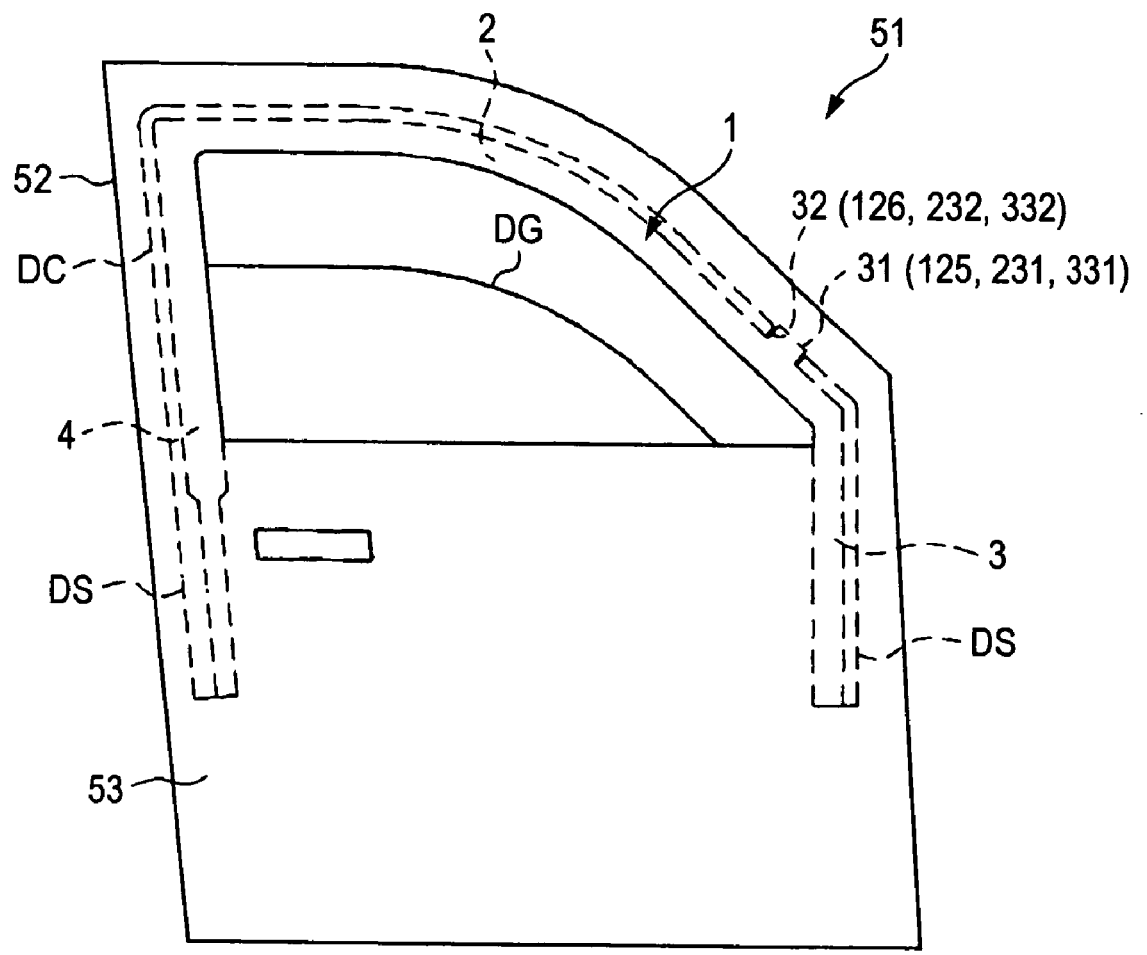
FIG. 1 is a front schematic view showing an outline constitution of a door.
Figure 2:
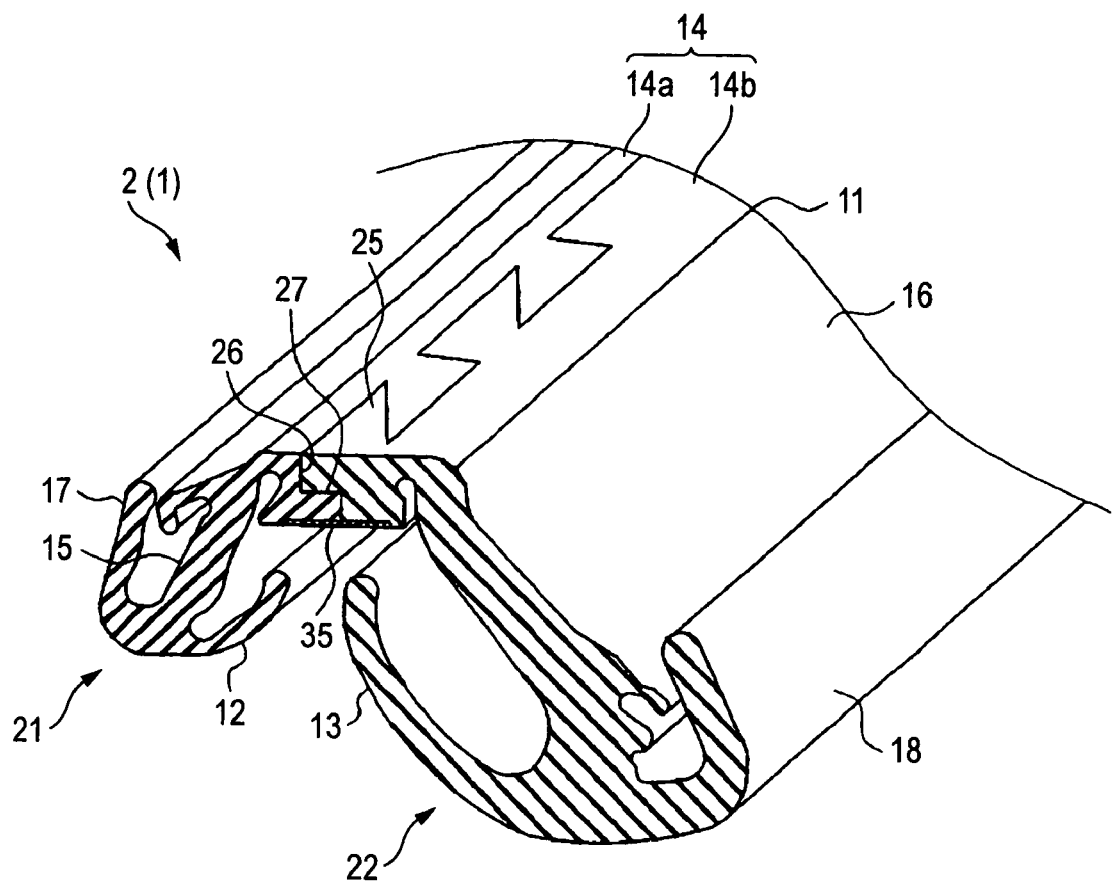
FIG. 2 is a partial perspective view of a glass run (first embodiment).
Figure 3:
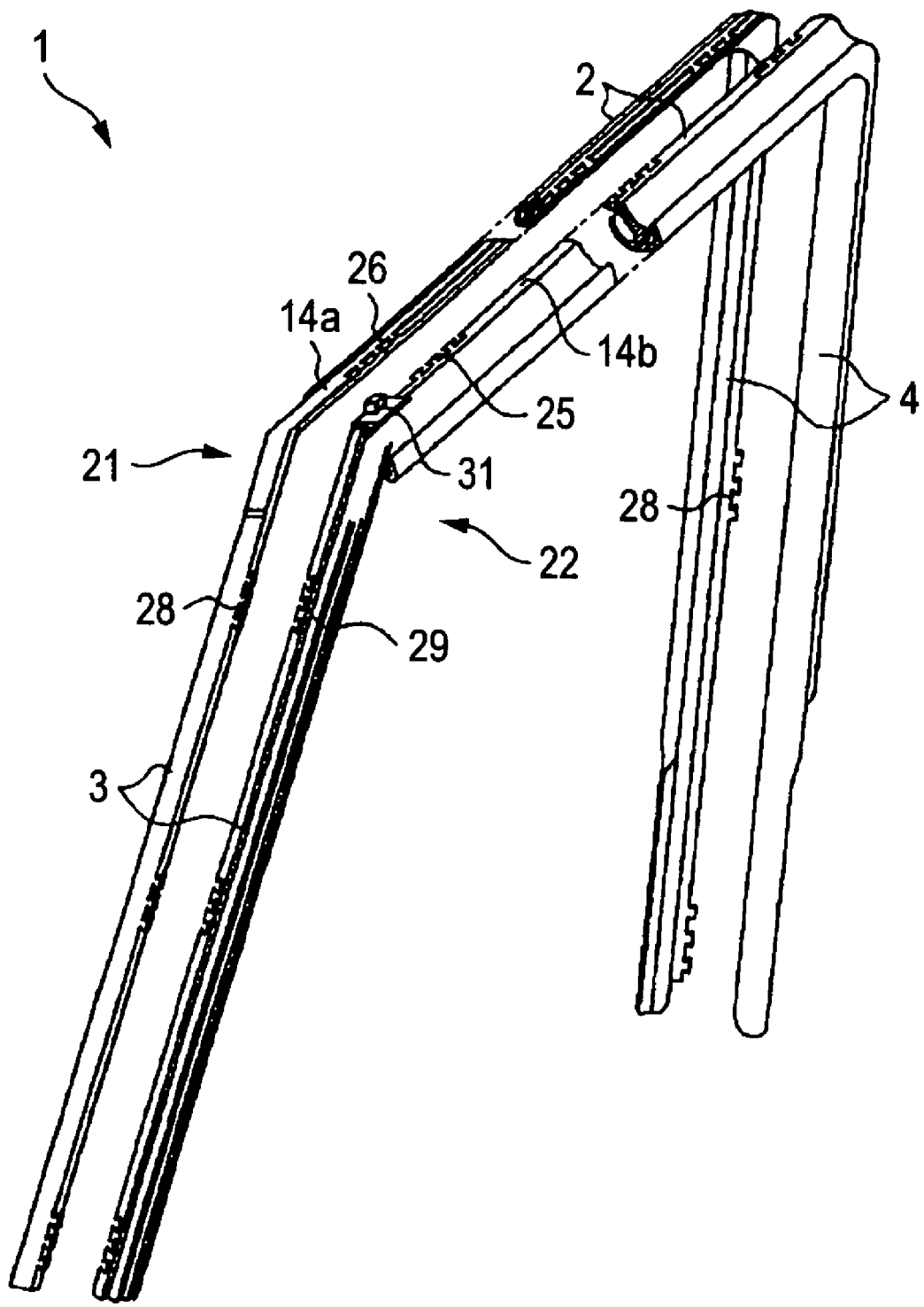
FIG. 3 is a disassembled perspective view of the glass run.

A first embodiment will be explained as follows in reference to the drawings. FIG. 1 is a front schematic view showing an outline constitution of a door. FIG. 2 is a partial perspective view showing an upper side portion of a glass run. FIG. 3 is a disassembled perspective view of the glass run.

As shown by FIG. 1, a door 51 (front door in the drawing) for an automobile is provided with a glass run 1 for guiding to move up and down door glass DG and sealing an interval between an outer periphery of the door glass DG and a door frame 52 when the door glass DG is moved up and an window portion is closed. Further in details, the glass run 1 includes an upper side portion 2 constituting a portion in correspondence with an upper edge portion of the door glass DG, a front vertical side portion 3 constituting a portion extended to a lower side from a tip end portion of the upper side portion 2 in correspondence with a front edge portion of the door glass DG, and a rear vertical side portion 4 constituting a portion extended to a lower side from a rear end portion of the upper side portion 2 in correspondence with a rear edge portion of the door glass DG. Further, the glass run 1 is attached to inner peripheries of a channel portion DC formed along an inner periphery of the door frame 52, and sash portions DS provided at inside of a door panel 53 to extend front and rear vertical side portions of the channel portion DC to a lower side. Further, the glass run 1 is constituted by EPDM (ethylene-propylene-diene copolymer rubber).

As shown by FIG. 2, the upper side portion 2 includes a main body portion 11 and a vehicle exterior side seal lip 12 and a vehicle interior side seal lip 13. The main body portion 11 includes a bottom portion 14 fitted to the channel portion DC and a vehicle exterior side wall portion 15 and a vehicle interior side wall portion 16 extended from the bottom portion 14 and constitutes a section substantially in a U-shape as a whole. The vehicle exterior side seal lip 12 is extended from substantially a tip end of the vehicle exterior side wall portion 15 to a side of an inner periphery of the main body portion 11, and the vehicle interior side seal lip 13 is extended substantially from a tip end of the vehicle interior side wall portion 16 to the side of the inner periphery of the main body portion 11. Further, in a state of closing the door glass DG, the vehicle exterior side seal lip 12 is brought into press contact with an outer side face of the door glass DG, and the vehicle interior side seal lip 13 is brought into press contact with an inner side face of the door glass DG. Thereby, the vehicle exterior side and the vehicle interior side of the door glass DG are respectively sealed. Further, there are provided a vehicle exterior side design lip 17 extended from the vehicle exterior side wall portion 15 to an outer side (vehicle exterior side), and a vehicle interior side design lip 18 extended from the vehicle interior side wall portion 16 to an outer side (vehicle interior side).

Further, also the front vertical side portion 3 and the rear vertical side portion 4 include the main body portion 11 and a pair of the seal lips 12, 13 and the like. However, with regard to portions of the glass run 1 which are arranged at inside of the lower panel 53 downward from a belt line and do not appear in an appearance (in this example, lower portions of the front vertical side portion 3 and the rear vertical side portion 4), the vehicle exterior side design lip 17 and the vehicle interior side design lip 18 are omitted to achieve downsizing along with the sash portion DS attached with the portions. Further, the vehicle exterior side seal lip 12 is constituted to be smaller (shorter) than the vehicle interior side seal lip 13. Thereby, the door glass DG is shifted to the vehicle exterior side to achieve flash surface formation.

Now, the glass run 1 according to the embodiment is constituted by two molded members to be divided to the vehicle exterior side and the vehicle interior side substantially at a center portion in a vehicle width direction of the bottom portion 14. Further in details, as shown by FIG. 2, FIG. 3, the glass run 1 is constituted by a vehicle exterior side molded member 21 in which the vehicle exterior side seal lip 12, the vehicle exterior side wall portion 15, and a half on a vehicle exterior side of the bottom portion 14 (hereinafter, referred to as vehicle exterior side bottom piece 14a are integrally subjected to molding, and a vehicle interior side molded member 22 in which the vehicle interior side seal lip 13, the vehicle interior side wall portion 16, and a half on a vehicle interior side of the bottom portion 14 (hereafter, referred to as vehicle interior side bottom piece 14b) are integrally subjected to molding. Further, although in FIG. 3, portions of the vehicle exterior side molded member 21 and the vehicle interior side molded member 22 constituting the glass run 1 in correspondence with the upper side portion 2 are illustrated to divide to separate at middle portions in longitudinal directions thereof, this is for convenience of illustration, and the vehicle exterior side molded member 21 and the vehicle interior side molded member 22 are made to be continuous over an entire region in the longitudinal direction of the glass run 1.

Further, the vehicle exterior side molded member 21 and the vehicle interior side molded member 22 are provided with engaging portions for engaging to integrate the both. Engaging portions according to the embodiment are constituted by a locking projected portion 25 constituting vehicle interior side engaging portion integrally formed to project to a tip end face of the vehicle interior side bottom piece 14b extended from the vehicle interior side wall portion 16, and a locking recess portion 26 constituting a vehicle exterior side engaging portion formed to chip off an outer face side of a tip end portion of the vehicle exterior side bottom piece 14a extended from the vehicle exterior side wall portion 15. Further, the vehicle exterior side molded member 21 and the vehicle interior side molded member 22 are integrated in a state of being butted together such that the tip end face of the vehicle exterior side bottom piece 14a and the tip end face of the vehicle interior side bottom piece 14b coincide with each other by fitting the locking projected portion 25 to the locking recess portion 26. Further, the locking projected portion 25 is constituted by a shape of a trapezoid a width of which is widened to the side of the tip end portion, and the locking recess portion 26 is constituted by a shape in correspondence therewith. Therefore, by fitting the locking projected portion 25 to the locking recess portion 26, a situation in which the vehicle exterior side bottom piece 14a and the vehicle interior side bottom piece 14b are detached in the vehicle width direction is made to be difficult to be brought about.

Further, the locking recess portion 26 is not penetrated in a thickness direction of the bottom portion 14 but is formed such that the outer face side of the tip end portion of the vehicle exterior side bottom piece 14a is notched as described above, and therefore, an inner peripheral side of the main body portion 11 of the locking recess portion 26 is formed with a bottom wall portion 27 constituting a bottom face of the locking recess portion 26. Further, in a state of integrating the vehicle exterior side molded member 21 and the vehicle interior side molded member 22, by bringing the bottom wall portion 27 and the locking projected portion 25 into contact with each other, in the thickness direction of the bottom portion 14, the vehicle interior side bottom piece 14b (locking projected portion 25) is positioned to the vehicle exterior side bottom piece 14a (locking recess portion 26).

Further, with regard to the front vertical side portion 3 and the rear vertical side portion 4, a locking projected portion 28 is formed on a side of the vehicle exterior side bottom piece 14a, a locking recess portion 29 is formed on a side of the vehicle interior side bottom piece 14b. Further, as shown by FIG. 3, pluralities of pieces of the locking projected portions 25, 28 and the locking recess portions 26, 29 are formed at pluralities of portions at predetermined intervals in longitudinal directions of the vehicle exterior side molded member 21 and the vehicle interior side molded member 22. Thereby, a situation of shifting the vehicle exterior side molded member 21 and the vehicle interior side molded member 22 in a longitudinal direction can be prevented.

In addition thereto, according to the embodiment, an end portion on a side of the front vertical side portion 3 of a portion of the vehicle interior side molded member 22 in correspondence with the upper end portion 2 is integrally provided with a projected portion 31 projected to a side in a direction of being attached to the channel portion DC (upper side) from the vehicle interior side bottom piece 14b. The projected portion 31 is molded simultaneously in subjecting the vehicle interior side molded member 22 to molding. Further, as shown by FIG. 1, the projected portion 31 is locked by the channel portion DC in a state of being fitted to an insertion hole 32 formed at the channel portion DC in a state of attaching the glass run 1 to the channel portion DC. Thereby, when the door glass DG is closed (when the door glass DG is brought into contact with the bottom portion 14 of the upper side portion 2), a situation that the glass run 1 is moved to shift to a rear side can be prevented.

Further, according to the embodiment, as shown by FIG. 2, a polyethylene (PE) tape 35 is pasted to an inner side face of the bottom portion 14 (a face on an inner peripheral side of the main body portion 11). Thereby, a performance of sliding the door glass DG is promoted. Further, a face of pasting the PE tape 35 of the bottom portion 14 constituted by the vehicle exterior side bottom piece 14a and the vehicle interior side bottom piece 14b is constituted by a flat face (flush).

Figure 4:
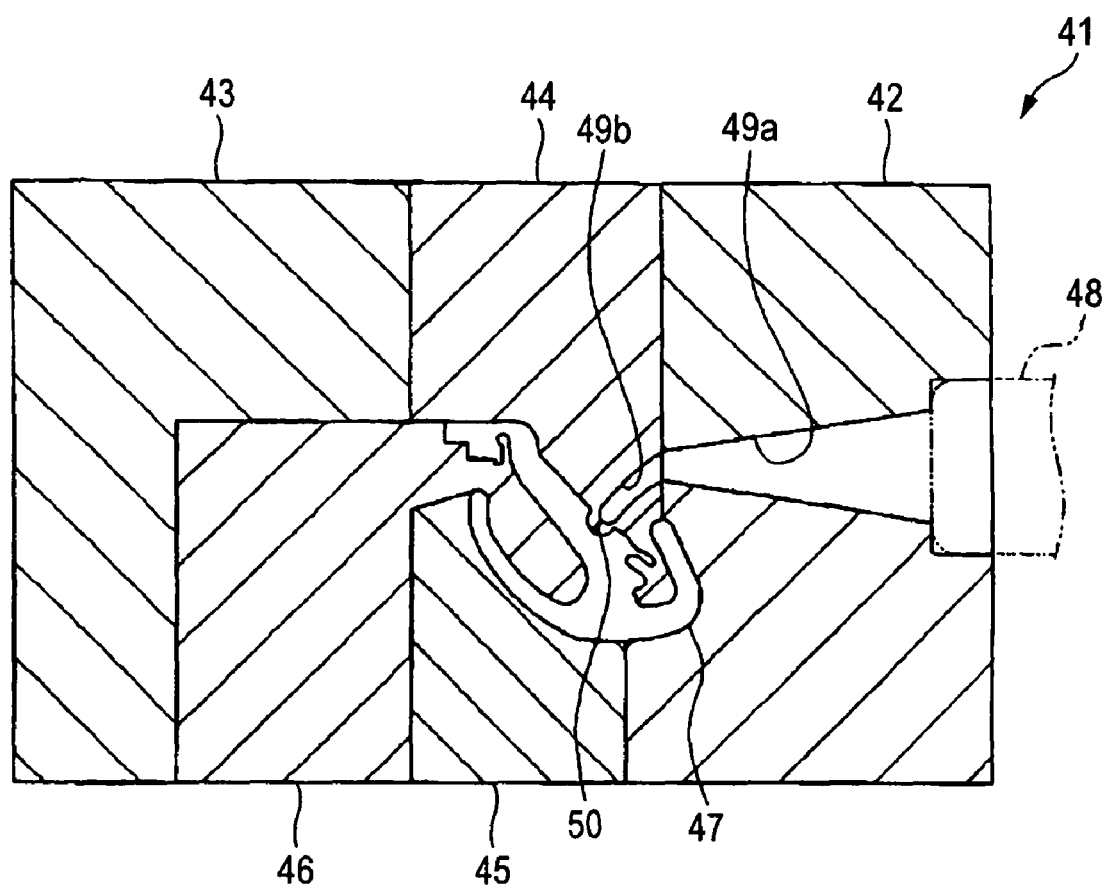
FIG. 4 is a sectional view showing a molding apparatus for molding a vehicle interior side molded member.

Next, a method of fabricating the glass run 1 will be explained. First, the vehicle exterior side molded member 21 and the vehicle interior side molded member 22 are respectively subjected to molding. Here, simply explaining of a method of fabricating the vehicle interior side molded member 22, the vehicle interior side molded member 22 is molded by using a molding apparatus 41 as shown by FIG. 4. That is, the molding apparatus includes a first mold 42, a second mold 43, a third mold 44, a fourth mold 45, a fifth mold 46. The first mold 42, the third mold 44, the fourth mold 45, the fifth mold 46 are respectively formed with mold faces in correspondence with an outer shape of the vehicle interior side molded member 22, and formed with a cavity 47 for molding the vehicle interior side molded member 22. Further, EPDM brought into a plasticized state by injecting means 48 is injected to inside of the cavity 47 by way of a sprue 49a formed by the first mold 42, a sprue 49b formed by the third mold 44 and a gate 50 to be filled. Thereafter, EPDM is vulcanized to solidify and the vehicle interior side molded member 22 molded by opening the mold after having been finished to solidify is detached from the molding apparatus 41. The vehicle interior side molded member 22 is fabricated as described above. Further, also the vehicle exterior side molded member 21 is fabricated by being subjected to molding similar to the vehicle interior side molded member 22 by using a molding apparatus in correspondence therewith.

Successively, the vehicle exterior side molded member 21 and the vehicle interior side molded member 22 subjected to molding as described above are integrated. That is, in correspondence with the upper side portion 3, the locking projected portion 25 provided at the vehicle interior side molded member 22 is fitted to the locking recess portion 26 provided at the vehicle exterior side molded member 21 and in correspondence with the front vertical side portion 3 and the rear vertical side portion 4, the locking projected portion 28 provided at the vehicle exterior side molded member 21 is fitted to the locking recess portion 29 provided at the vehicle interior side molded member 22. Thereby, there is constituted an entire region in the longitudinal direction of the main body of the glass run 1 including the upper side portion 2, the front vertical side portion 3, the rear vertical side portion 4, and connecting portions (corner portion) of the upper side portion 2 and the front vertical side portion 3, the rear vertical side portion 4 constituting a sectional shape having the main body portion 11 and the seal lips 12, 13 and the like.

Thereafter, the glass run 1 is fabricated by pasting the PE tape 35 to the inner side face of the bottom portion 11.

As described above in details, according to the embodiment, by integrating the vehicle exterior side molded member 21 and the vehicle interior side molded member 22 by fitting the locking projected portions 25, 28 to the locking recess portions 26, 29, the vehicle exterior side molded member 21 is restricted from being moved in the vehicle width direction relative to the vehicle interior side molded member 22 and in the longitudinal direction of the vehicle interior side molded member 22, and the entire region in the longitudinal direction of the glass run 1 comprising the upper side portion 2, the front vertical side portion 3, and the rear vertical side portion 4 is constituted. That is, the glass run 1 can be constituted only by the molded member. Therefore, a situation in which a connecting line of an extruded member and a molded member appears in an appearance can be avoided as in, for example, a case in which the glass run 1 is constituted by connecting the extruded member and the molded member in the longitudinal direction. Further, the glass run 1 (glass run 1 main body) can be constituted by a single material, and therefore, a situation in which a difference in color/glaze is brought about partially in the longitudinal direction (peripheral direction) of the glass run 1 can be avoided. As a result, the appearance quality is promoted. Further, a concern that a stepped difference is formed in the longitudinal direction of the glass run 1 can be avoided and the sealing performance is promoted.

Further, the glass run 1 is constituted by the vehicle exterior side molded member 21 and the vehicle interior side molded member 22 separately subjected to molding, and therefore, the glass run 1 needs not to be molded by a developed shape of considerably widening the vehicle exterior side wall portion 15 and the vehicle interior side wall portion 16 but can be constituted by a shape by which the sectional shape needs not to be deformed considerably in being attached to the channel portion DC (sash portion DS). Therefore, the state of attaching the glass run 1 to the channel portion DC can be stabilized (promote sealing performance) or the like. In addition thereto, since the vehicle exterior side molded member 21 and the vehicle interior side molded member 22 are respectively subjected to molding, in comparison with a case of a glass run having a shape of combining the both members subjected to molding in one operation, structures of molds promoting the respective molded members 21, 22 can be simplified or the like.

Further, a molded member is provided with a high degree of freedom in product design in comparison with that of an extruded member, and therefore, even when, for example, a sectional shape is made to differ at a specific portion (for example, providing a projection, shortening a seal lip or the like), the sectional shape can easily be molded by molding. Therefore, a situation that an operation is separately needed in order to make the sectional shape differ at the specific portion can be avoided, and productivity is promoted. Further, although according to the embodiment, the portion of the glass run 1 downward from the belt line (lower portion of rear vertical side portion 4 and front vertical side portion 3) is constituted by the shape of omitting the design lips 17, 18, in subjecting the vehicle exterior side molded member 21 and the vehicle interior side molded member 22 to molding, the molding members 21, 22 can be formed simultaneously with other portion without carrying out a separate operation of cutting the design lips 17, 18 or the like.

In addition thereto, generally, according to the molded member, a variation (fabrication error) in the sectional shape is smaller than that of the extruded member, the glass run 1 (main body of glass run 1) according to the embodiment is constituted only by the molded members (21, 22), and therefore, the quality can be promoted. Further, in comparison with a case of constituting the glass run 1 by the extruded member and the molded member, according to the embodiment, time and labor of fabricating, inspecting the extruded member, or integrating the extruded member in molding can be omitted. As a result, an operational efficiency can be promoted, an equipment can be simplified, and therefore, productivity can be promoted and the cost can be reduced.

Further, for example, when the vehicle exterior side molded member 21 and the vehicle interior side molded member 22 are connected by an adhesive, there is a concern of reducing a fabrication operability by being caused by requiring a time period until the adhesive is dried and necessitating to hold the vehicle exterior side molded member 21 and the vehicle interior side molded member 22 in a state of bringing faces thereof coated with the adhesive into press contact with each other or the like. Particularly, when the adhesive is extruded to an inner side face or an outer side face of the face bottom portion 14 from a connecting face (a tip end face of the vehicle exterior side bottom piece 14a and a tip end face of the vehicle interior side bottom piece 14b), there is a concern that the performance of sliding the door glass DG is deteriorated or the state of attaching the glass run 1 to the channel portion DC becomes unstable.

In this respect, a reduction in the fabrication operability can be restrained by providing engaging portions (engaging projected portion 25, engaging recess portion 26) and directly integrating the vehicle exterior side molded member 21 and the vehicle interior side molded member 22 by the engaging portions as in the embodiments. Further, the locking projected portion 25 is provided so as not to project from the inner side face and the outer side face of the face bottom portion 14 at the tip end faces of the vehicle interior side bottom piece 14b and the tip end face of the vehicle exterior side bottom piece 14a butted together in the state of integrating the vehicle exterior side molded member 21 and the vehicle interior side molded member 22. Therefore, a concern that a stepped difference is formed on the inner peripheral side and the outer peripheral side of the main body portion 11 by the engaging portions can be avoided. Therefore, a concern that a performance of sliding the door glass DG is deteriorated, or the state of attaching the glass run 1 to the channel portion DC becomes unstable can be prevented.

Further, by integrating the vehicle exterior side molded member 21 and the vehicle interior side molded member 22, the vehicle exterior side molded member 21 is restricted from being moved to shift in the vehicle width direction relative to the vehicle interior side molded member 22 and the vehicle interior side molded member 22 is restricted from being shifted to move in the longitudinal direction. Therefore, the vehicle exterior side molded member 21 and the vehicle interior side molded member 22 can precisely be integrated and the integrated state can be stabilized. Therefore, a concern that the sealing performance is deteriorated, the state of being attached to the attaching portion is deteriorated, the attaching operability is deteriorated by being caused by shifting or detaching the vehicle exterior side molded member 21 and the vehicle interior side molded member 22 can be prevented.

Further, when the glass run 1 is divided into the vehicle exterior side molded member 21 and the vehicle interior side molded member 22 at a root of the seal lip 12 or 13 or a vicinity thereof, there is a concern of complicating a mold structure for molding one of the molded members 21, 22. In this respect, according to the embodiment, the glass run 1 is divided into the vehicle exterior side molded member 21 and the vehicle interior side molded member at the bottom portion 14, and therefore, the mold structure can be restrained from being complicated and the degree of freedom of design is increased. Further, the boundary portion (connecting line) of the vehicle exterior side molded member 21 and the vehicle interior side molded member 22 can firmly be disposed on the inner peripheral side of the channel portion DC, and a concern that the appearance quality is deteriorated by being caused by the fact that the boundary portion appears at the appearance can be prevented.

Further, according to the embodiment, the PE tape 35 is pasted to the bottom portion 14 to cover a portion of integrating the vehicle exterior side molded member 21 and the vehicle interior side molded member 22 (connecting portion, boundary portion). Therefore, the state of integrating the vehicle exterior side molded member 21 and the vehicle interior side molded member 22 can be stabilized. Further, the face of the bottom portion 14 pasted with the PE tape 35 is constituted by the flat face, and therefore, the PE tape 35 can excellently be pasted and a concern that the face of the sliding the door glass DG is constituted by a recessed and projected shape can be prevented.

Further, the invention is not limited to a described content of the above-descried embodiment but may be embodied as, for example, follows. Naturally, other fabrication example, change example which are not exemplified in the following can be embodied.

(a) Although in the above-described embodiment, the glass run 1 is divided to the vehicle exterior side (vehicle exterior side molded member 21 and the vehicle interior side (vehicle interior side molded member 22) substantially at a center portion in the vehicle width direction of the bottom portion 14, the invention is not particularly limited to such a constitution. The glass run 1 may be divided into the vehicle exterior side molded member 21 and the vehicle interior side molded member 22 at any portion of the main body portion 11. For example, the glass run 1 may be divided into the vehicle exterior side molded member 21 and the vehicle interior side molded member 22 at a middle portion of the vehicle interior side wall portion 16. However, from a viewpoint of restraining complication of a mold, it is preferable to divide the glass run 1 into the vehicle exterior side molded member 21 and the vehicle interior side molded member 22 at the bottom portion 14 or a vicinity thereof (at a vicinity of a root portion of the vehicle exterior side wall portion 15 or the vehicle interior side wall portion 16).

Figure 5A:
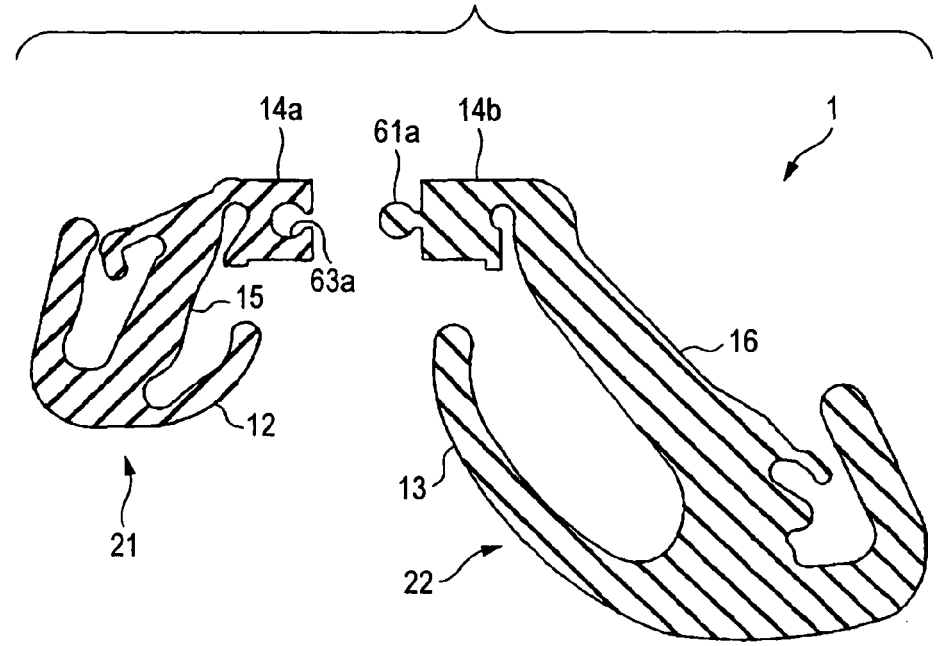
FIG. 5A is a sectional view showing a vehicle exterior side molded member and a vehicle interior side molded member in a change example.
Figure 5B:
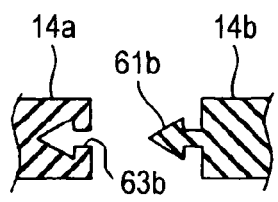
FIGS. 5B through 5D are sectional views showing vehicle exterior side bottom pieces and vehicle interior side bottom pieces in change examples.
Figure 5C:
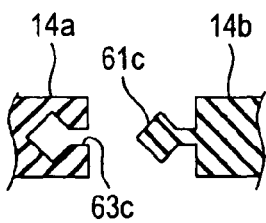
Figure 5D:
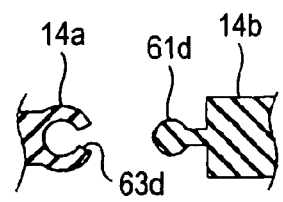
Figure 6A:
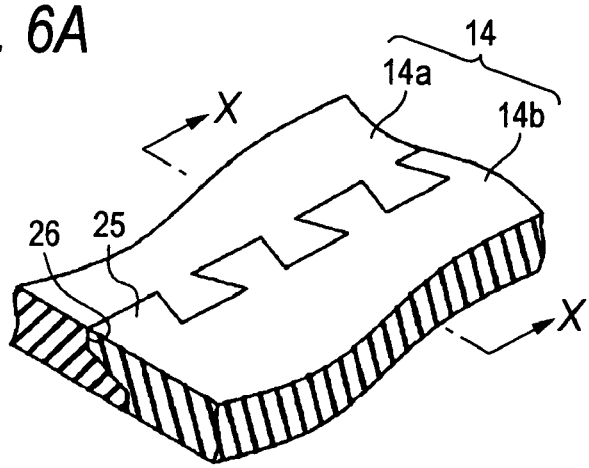
FIG. 6A is a partial perspective view showing a vehicle exterior side bottom piece and a vehicle interior side bottom piece in a change example.
Figure 6B:
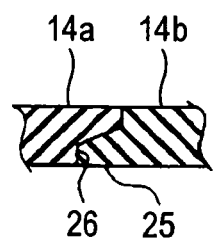
FIG. 6B is a sectional view taken along a line X-X of FIG. 6A.
Figure 7A:
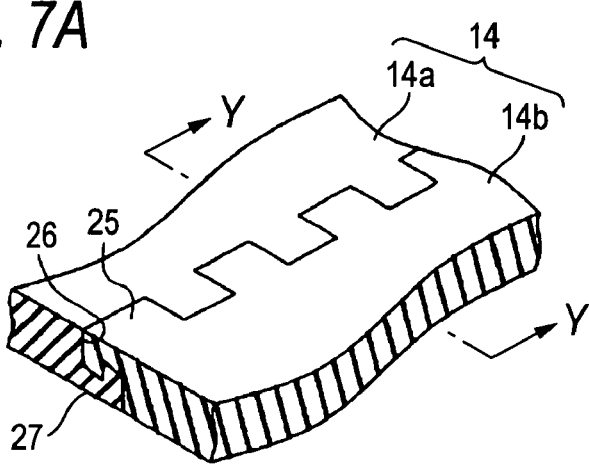
FIG. 7A is a partial perspective view showing a vehicle exterior side bottom piece and a vehicle interior side bottom piece in a change example.
Figure 7B:
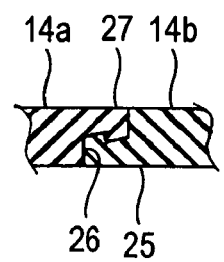
FIG. 7B is a sectional view taken along a line Y-Y of FIG. 7A.
Figure 8:
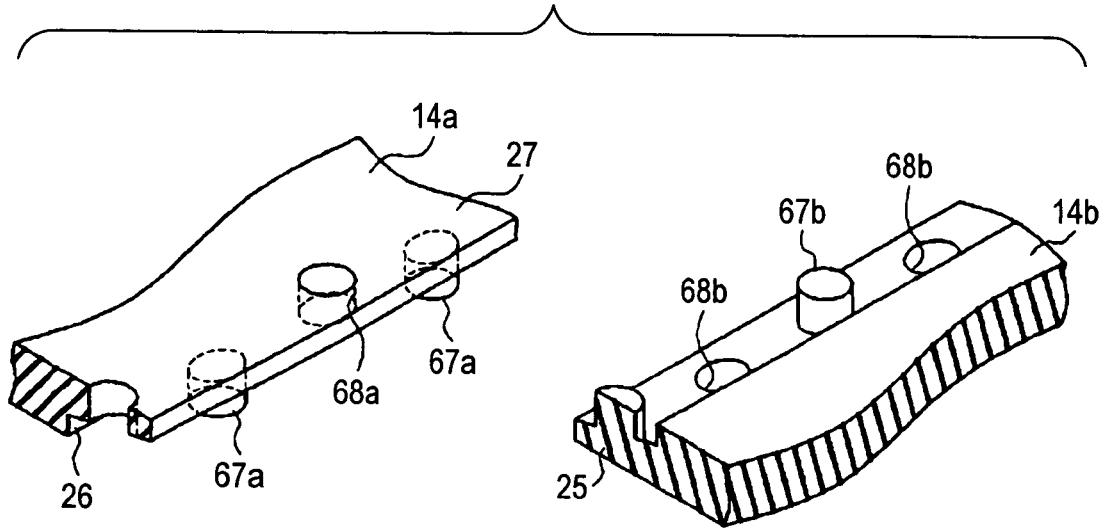
FIG. 8 is a disassembled perspective view showing a vehicle exterior side bottom piece and a vehicle interior side bottom piece in a change example.
Figure 9A:
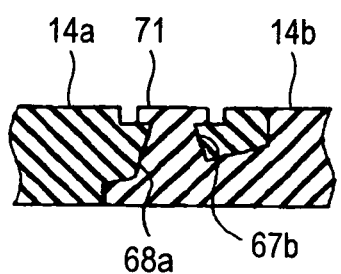
FIGS. 9A, 9B illustrate sectional views showing a vehicle exterior side bottom piece and a vehicle inner bottom piece in a change example.
Figure 9B:
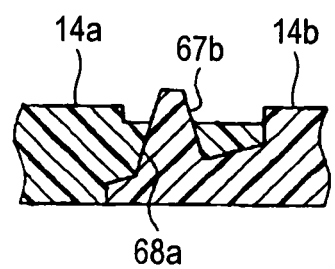

(b) A constitution of the engaging portions according to the embodiment is not particularly limited but there may be constructed a constitution capable of positioning the vehicle exterior side molded member 21 (vehicle exterior side bottom piece 14a) and the vehicle interior side molded member 12 (vehicle interior side face bottom piece 14b) in the width direction and the longitudinal direction of the glass run 1 and capable of directly engaging (connecting) the both. In the following, the embodiment examples will be explained in reference to the drawings. FIG. 5A is a sectional view showing the vehicle exterior side molded member 21 and the vehicle interior side molded member 22 in a change example, and FIGS. 5B through 5D are sectional views showing the vehicle exterior side bottom piece 14a and the vehicle interior side bottom piece 14b in the change example. FIG. 6A is a partial perspective view showing the vehicle exterior side bottom piece 14a and the vehicle interior side bottom piece 14b in the change example, FIG. 6B is a sectional view taken along a line X-X of FIG. 6A. FIG. 7A is a partial perspective view showing the vehicle exterior side bottom piece 14a and the vehicle interior side bottom piece 14b in the change example, FIG. 7B is a sectional view taken along a line Y-Y of FIG. 7A. FIG. 8 is a disassembled perspective view showing the vehicle exterior side bottom piece 14a and the vehicle interior side bottom piece 14b in the change example. FIGS. 9A, 9B are sectional views showing a modified example of the vehicle exterior side bottom piece 14a and the vehicle interior side bottom piece 14b illustrated in FIG. 8.

For example, as shown by FIGS. 5A through 5D, a tip end of substantially a center portion in a thickness direction of the vehicle interior side bottom piece 14b in a tip end face of the vehicle interior side bottom piece 14b may be projected with engaging projections 61a, 61b, 61c, 61d each having a diameter enlarging portion a section of which is formed substantially in a circular shape, substantially in a triangular shape (arrow mark shape), substantially a rhombic shape or the like, and substantially a center portion in a thickness direction of the vehicle exterior side portion 14a in a tip end face of the vehicle exterior side bottom piece 14a may be formed with engaging holes 63a, 63b, 63c, 63d for fitting to engage the engaging projections 61a, 61b, 61c, 61d. In this case, the engaging projections 61a, 61b, 61c, 61d and the engaging holes 63a, 63b, 63c, 63d constitute engaging portions. Further, by adopting the constitution, a concern that the vehicle exterior side molded member 21 and the vehicle interior side molded member 22 are detached in the vehicle width direction can be restrained and a concern that the vehicle interior side molded member 22 is detached from the vehicle exterior side molded member 21 in a direction of being attached to the channel portion DC (thickness direction of bottom portion 14) can be restrained.

Further, also with regard to the engaging projections 61a, 61b, 61c, 61d and the engaging holes 63a, 63b, 63c, 63d shown in FIGS. 5A through 5D, similar to the locking projected portions 25, 28 and the locking recess portions 26, 29 in the embodiment, in the longitudinal direction of the vehicle exterior side molded member 21 and the vehicle interior side molded member 22, it is preferable to form a plurality of pieces thereof at a plurality of portions at predetermined intervals. In this case, a situation that the vehicle exterior side molded member 21 and the vehicle interior side molded member 22 are shifted from each other in the longitudinal direction can be prevented. As a result, the vehicle exterior side molded member 21 and the vehicle interior side molded member 22 can precisely be integrated.

Further, for example, as shown by FIGS. 6A, 6B, in a state of integrating the vehicle exterior side molded member 21 and the vehicle interior side molded member 22, the locking projection 25 according to the embodiment may be formed to be exposed alternately to a face side of the inner peripheral side of the main body portion 11 and a face side of the outer peripheral side of the main body portion 11, and the locking recess portion 26 may be formed in correspondence with the locking projected portion 25 (in a state before integrating the vehicle exterior side molded member 21 and the vehicle interior side molded member 22, the locking recess portion 26 is exposed alternately to the face side on the inner peripheral side of the main body portion 11 and the face side on the outer peripheral side of the main body portion 11). In this case, the locking projected portion 25 and the locking recess portion 26 are engaged to each other in zigzag along the longitudinal direction of the glass run 1, and therefore, a concern that the vehicle interior side molded member 22 is detached from the vehicle exterior side molded member 21 in the direction of being attached to the channel portion DC can be restrained.

Further, for example, as shown by FIGS. 7A, 7B, the locking projected portion 25 and the bottom wall portion 27 may be constituted by an L-like shape (hook shape) in sections thereof when cut in the vehicle width direction to thereby restrain the both members from being separated in the vehicle width direction when the vehicle exterior side molded member 21 and the vehicle interior side molded member 22 are integrated.

Further, for example, as shown by FIG. 8, a face of the locking projected portion 25 opposed to the bottom wall portion 27 and a face of the bottom wall portion 27 opposed to the locking projected portion 25 may be provided with projected portions 67a, 67b and hole portions 68a, 68b alternately along the longitudinal direction of the glass run 1, the projected portion 67a provided at the locking projected portion 25 may be fitted to the hole portion 68b provided at the bottom wall portion 27, the projected portion 67b provided at the bottom wall portion 27 may be fitted to the hole portion 68a provided at the locking projected portion 25. In this case, the projected portions 67a, 67b and the hole portions 68a, 68b provided at the locking projected portion 25 and the bottom wall portion 27 constitute engaging portions.

Further, for example, as shown by FIG. 9A, by providing small undercuts (diameter enlarging portions 71) at tip end portions of the projected portions 67a, 67b illustrated in FIG. 8, the projected portions 67a, 67b and the hole portions 68a, 68b can further firmly be engaged. The diameter enlarging portion 71 may be formed simultaneously with the vehicle exterior side molded member 21 and the vehicle interior side molded member 22. Further, for example, when the projected portions 67a, 67b are constituted by TPO, as shown by FIG. 9B, when the vehicle exterior side molded member 21 and the vehicle interior side molded member 22 are subjected to molding, the diameter enlarging portion 71 as shown by FIG. 9A may be formed by forming the projected portions 67a, 67b to constitute heights projected from the hole portions 68a, 68b in correspondence therewith, integrating the vehicle exterior side molded member 21 and the vehicle interior side molded member 22, thereafter, subjecting the projected portions 67a, 67b to so-to-speak thermal welding of crushing the tip end portions of the projected portions 67a, 67b while applying heat to tip end portions thereof.

Naturally, the above-described engaging portions can be combined, or engaging portions having partially different shapes (for example, at the upper side portion 2, the front vertical side portion 3, the rear vertical side portion 4) can be adopted. Further, the engaging portions may be formed over an entire region in the longitudinal direction of the glass run 1 (continuously) or may be formed intermittently, partially.

(c) Although according to the first embodiment, the projected portions 31 is subjected to molding simultaneously in subjecting the vehicle interior side molded member 22 to molding, for example, the projected portion 31 may be formed by subjecting a portion of the projected portion 31 to insert molding to be embedded in the vehicle interior side bottom piece 14b in subjecting the vehicle interior side molded member 22 to molding. In this case, the projected portion 31 can be constituted by a material harder than that of the bottom portion 14, and the glass run 1 can firmly be prevented from being shifted to move in closing the door glass DG. Further, the projected portion 31 can also be omitted.

(d) Although according to the first embodiment, the vehicle exterior side molded member 21 and the vehicle interior side molded member 22 are constituted to be able to be connected (integrated) by providing the engaging portions and the integrated state is stabilized by pasting the PE tape 35 to the inner side face of the bottom portion 14, the invention is not particularly limited to the constitution. For example, the vehicle exterior side molded member 21 and the vehicle interior side molded member 22 can also be connected only by the engaging portions by omitting the PE tape 35.

Further, for example, the vehicle exterior side molded member 21 and the vehicle interior side molded member 22 may be connected by an adhesive. However, when the adhesive is used, there is a concern of deteriorating fabrication operability by being caused by the fact that a time period is required until drying the adhesive, it is necessary to hold the vehicle exterior side molded member 21 and the vehicle interior side molded member 22 in a state of bringing faces of the vehicle interior side molded member 22 and the vehicle exterior side molded member 21 coated with the adhesive into press contact with each other and the like. There is also a concern of extruding the adhesive from the connecting face. From such a view point, it is preferable to connect the vehicle exterior side molded member 21 and the vehicle interior side molded member 22 by engaging portions as in the above-described embodiment.

Further, the vehicle exterior side molded member 21 and the vehicle interior side molded member 22 can also be connected only by the tape member of the PE tape 35 or the like by omitting the engaging portions (locking projected portions 25, 28, locking recess portions 26, 29). However, although in this case, the tape members may be pasted to both of inner and outer faces of the bottom portion 14 to stabilize the integrated state, there is a concern of bringing about reduction in operability, a drawback caused by an increase in a wall thickness of the bottom portion 14, or an error in pasting the tape member. From such a view point it is preferable to connect the vehicle exterior side molded member 21 and the vehicle interior side molded member 22 by the engaging portions capable of positioning the vehicle exterior side bottom piece 14b and the vehicle interior side bottom piece 14b in the thickness direction of the bottom portion 14 without changing the wall thickness of the bottom portion 14.

(e) The sectional shape of the glass run 1 is not particularly limited but may be provided with at least the main body portion 11 and the pair of seal lips 12, 13. For example, the design lips 17, 18 may be omitted. Further, the boundary portions of the vehicle exterior side wall portion 15 and the vehicle interior side wall portion 16 and the bottom portion 14 are formed with cuts (notches) in FIG. 2 or the like although not particularly referred to in the above-described embodiment. The cut portion is formed with an object of easily narrowing the both side wall portions in being attached to the channel portion DC since it is necessary to mold the glass run by the developed shape in the background art technology of simultaneously forming the main body portion, the vehicle exterior side seal lip, and the vehicle interior side seal lip. According to the embodiment, the glass run 1 is divided into the vehicle exterior side molded member 21 and the vehicle interior side molded member 22 to subject to molding, and therefore, it is not necessary to constitute the developed shape as described above, and therefore, the cut portion can be omitted. However, when the PE tape 35 is pasted to the inner side face or the like of the bottom base portion of the glass run 1 brought into the state of integrating the vehicle exterior side molded member 21 and the vehicle interior side molded member 22 as in the embodiment, the operability is promoted when the cut portion is present. Further, in place of the PE tape 35, a sliding layer may be formed by coating a sliding agent at the inner side face of the bottom base portion 14. In this case, even when the cut portion is not present, before integrating the vehicle exterior side molded member 21 and the vehicle interior side molded member 22, the sliding agent can easily and firmly be coated to the inner peripheral face of the man body portion 11.

Further, when in order to promote sliding performance of the seal lips 12, 13, for example, urethane is coated, a hairy object is implanted, the polyethylene (PE) tape is pasted, it is preferable to carry out at a stage at which the vehicle exterior side molded member 21 and the vehicle interior side molded member 22 are separated. In this case, a situation that the operation becomes an operation while finishing to widen the vehicle exterior side wall portion 15 and the vehicle interior side wall portion 16 as in the case of carrying out the operation after integrating the vehicle exterior side molded member 21 and the vehicle interior side molded member 22 can be avoided and operability is promoted or the like.

(f) Although according to the embodiment, the main body portion 11 and the seal lips 12, 13 (vehicle exterior side molded member 21 and vehicle interior side molded member 22) are constituted by EPDM, these may be constituted by other material of TPO or the like. Further, even in a case of adopting any material of rubber, TPO and the like, the glass run 1 may be colored in accordance with a color of an outer plate of the vehicle. Further, in the above-described embodiment, since the glass run 1 is divided into the vehicle exterior side molded member 21 and the vehicle interior side molded member 22, the glass run 1 (vehicle exterior side molded member 21 and the vehicle interior side molded member 22) can also be colored respectively in accordance with the color of the outer plate and the color of an interior of the vehicle. Further, although according to the embodiment, a particularly detailed explanation is given of the glass run 1 of the front door, even in a glass run of the rear door or the like, the glass run may be constituted similarly by the vehicle exterior side molded member 21 and the vehicle interior side molded member 22.

Second Embodiment

Figure 10:
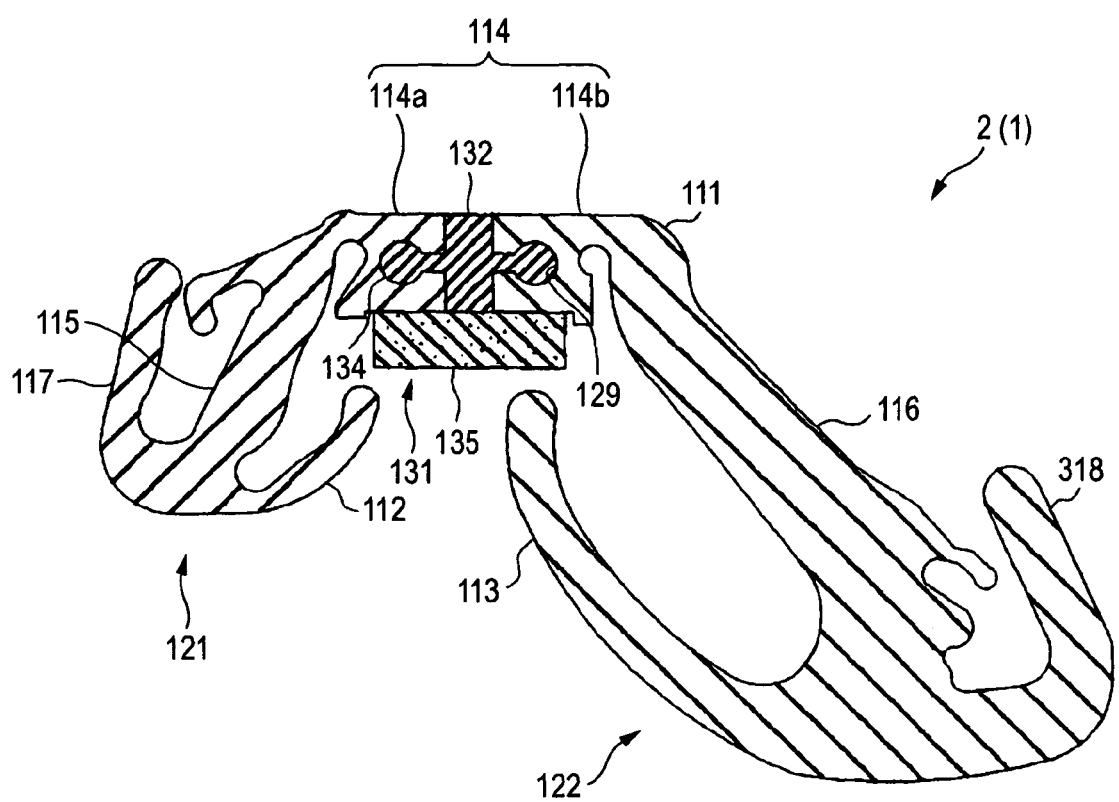
FIG. 10 is a sectional view of a glass run (second embodiment).
Figure 11:
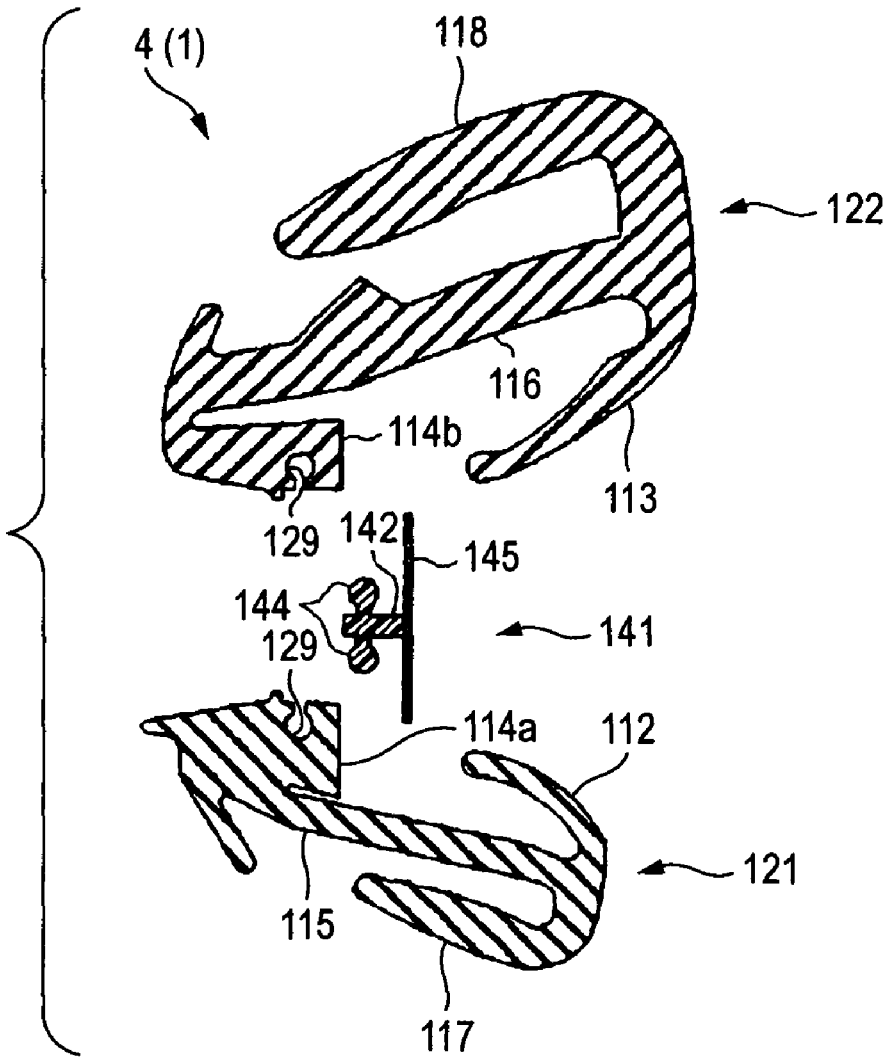
FIG. 11 is a sectional view showing a disassembled state of the glass run.
Figure 12:
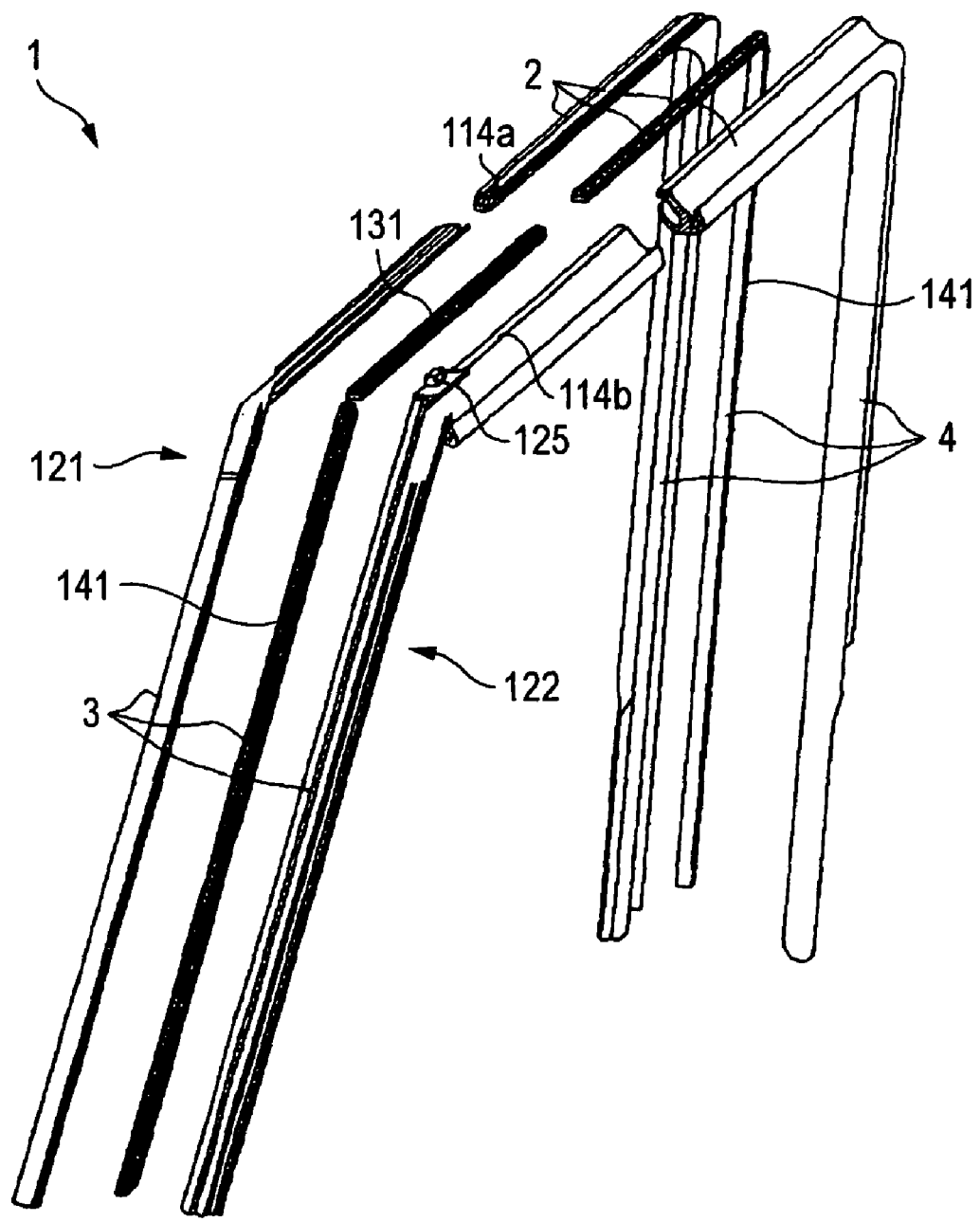
FIG. 12 is a disassembled perspective view of the glass run.

A second embodiment will be explained as follows in reference to the drawings. FIG. 10 is a sectional view showing an upper side portion of the glass run. FIG. 11 is a sectional view showing a rear vertical side portion of the glass run in a disassembled state. FIG. 12 is a disassembled perspective view of the glass run.

According to the second embodiment, as shown by FIG. 10, an upper side portion 2 includes a main body portion 111 and a vehicle exterior side seal lip 112 and a vehicle interior side seal lip 113. The main body portion 111 includes a bottom portion 114 fitted to a channel portion DC and a vehicle exterior side wall portion 115 and a vehicle interior side wall portion 116 extended from the bottom portion 114, and constitutes a section substantially in a U-shape as a whole. The vehicle exterior side seal lip 112 is extended substantially from a tip end of the vehicle exterior side wall portion 115 to a side of an inner periphery of the main body portion 111, the vehicle interior side seal lip 113 is extended substantially from a tip end portion of the vehicle interior side wall portion 116 to the side of the inner periphery of the main body portion 111. Further, in a state of closing the door glass DG, the vehicle exterior side seal lip 112 is brought into press contact with an outer side face of the door glass DG and the vehicle interior side seal lip 113 is brought into press contact with an inner side face of the door glass DG. Thereby, a vehicle exterior side and a vehicle interior side of the door glass DG are respectively sealed. Further, there are provided a vehicle exterior side design lip 117 extended from the vehicle exterior side wall portion 115 to a vehicle exterior side and a vehicle interior side design lip 118 extended from the vehicle interior side wall portion 116 to a vehicle interior side.

Further, also the front vertical side portion 3 and the rear vertical side portion 4 (refer to FIG. 11) are provided with the main body portion 11 and the pair of seal lips 112, 113 and the like. However, with regard to a portion of the glass run 1 according to the second embodiment which is arranged at inside of a lower panel 53 downward from a belt line does not appear in an appearance (according to the example, lower portions of the front vertical side portion 3 and the rear vertical side portion 4), the vehicle exterior side design lip 117 and the vehicle interior side design lip 118 are omitted to downsize along with a sash portion DS to which the portion is attached. Further, the vehicle exterior side seal lip 112 is made to be shorter than the vehicle interior side seal lip 113. Thereby, the door glass DG is shifted to the vehicle exterior side to achieve flash surface formation.

As shown by FIG. 10, FIG. 11, FIG. 12, the glass run 1 according to the embodiment is divided to a portion on a vehicle exterior side and a portion on a vehicle interior side substantially at a center portion in a vehicle width direction of the bottom portion 114, and the portion on the vehicle exterior side and the portion on the vehicle interior side are individually subjected to molding by using a molding apparatus respectively in correspondence therewith. A vehicle exterior side molded member 121 constituting the portion on the vehicle exterior side of the glass run 1 integrally includes the vehicle outer seal lip 112, the vehicle exterior side wall portion 115 and a portion on the vehicle exterior side of the bottom portion 114 (hereinafter, referred to as vehicle exterior side bottom piece 114a). The vehicle interior side molded member 112 constituting the portion on the vehicle interior side of the glass run 1 integrally includes the vehicle interior side seal lip 113, the vehicle interior side wall portion 116, and a portion on the vehicle interior side of the bottom portion 114 (hereinafter, referred to as vehicle interior side bottom piece 114*b*). Further, the vehicle exterior side molded member 121 and the vehicle interior side molded member 122 are constituted by EPDM (ethylene-propylene-diene copolymer rubber). Further, although in FIG. 12, portions of the vehicle exterior side molded member 121 and the vehicle interior side molded member 122 constituting the glass run 1 in correspondence with the upper side portion 2 are illustrated to be separated at middle portions in longitudinal directions thereof, this is for convenience of explanation, and the vehicle exterior side molded member 121 and the vehicle interior side molded member 122 are made to be continuous over an entire region in the longitudinal direction of the glass run 1.

Further, according to the embodiment, the vehicle exterior side molded member 121 and the vehicle interior side molded member 122 are connected by an upper connecting member 131, a vertical connecting member 141. As shown by FIG. 10, the upper connecting member 131 provided in correspondence with the upper side portion 2 includes a connecting portion main body 132 including engaging portions 134 engaged with engaged portions 129 formed at respective tip end portions of the vehicle exterior side bottom piece 114*a* and the vehicle interior side bottom piece 114*b*, and a functioning portion 135 extended from the connecting portion main body 132 in both side directions. The engaging portion 134 according to the embodiment is constituted as a projection having a diameter enlarging portion having a section substantially in a circular shape at a tip end thereof, and the engaged portion 129 are constituted as hole portions formed at tip end faces of the vehicle exterior side bottom piece 114 and the vehicle interior side bottom piece 114*b* (naturally, a relationship of the both may be reversed). Further, by engaging the engaging portion 134 to the engaged portion 129, the vehicle exterior side molded member 121 and the vehicle interior side molded member 122 are connected by restraining the vehicle interior side bottom piece 114*b* from being moved to shift in the vehicle width direction relative to the vehicle exterior side bottom piece 114*a* and restraining the vehicle interior side bottom piece 114*b* in a direction of being attached to the channel portion DC (sash portion DS).

Further, the upper connecting member 131 is arranged such that the connecting main body 132 is pinched between a tip end portion of the vehicle exterior side bottom piece 114*a* and a tip end portion of the vehicle interior side bottom piece 114*b* in a state of connecting the vehicle exterior side molded member 121 and the vehicle interior side molded member 122, and faces of the functioning portions 135 are brought into contact with the inner side faces of the vehicle exterior side bottom piece 114*a* and the vehicle interior side bottom piece 114*b*. Thereby, an inner side portion of the bottom piece 114 brought into contact with an upper edge portion of the door glass DG is constituted by the functioning portion 135.

Further, according to the upper connecting member 131, the connecting portion main body 132 is constituted by solid EPDM, the functioning portion 135 is constituted by sponge EPDM. Further, the functioning portion 135 comprising the sponge EPDM is constituted to be more thick-walled than a functioning portion 145 mentioned later such that an impact caused by being brought into contact with the door glass DG can sufficiently be absorbed.

Further, also the vertical connecting member 141 provided at the rear vertical side portion 4 (front vertical side portion 3) is provided with a basic constitution similar to that of the upper connecting member 131. That is, as shown by FIG. 3, the vertical connecting member 141 includes a connecting portion main body 142 having an engaging portion 144 engaged with an engaged portion 129 and the functioning portion 145 in a plate-like shape provided at the connecting portion main body 142. Further, in a state of connecting the vehicle exterior side molded member 121 and the vehicle interior side molded member 122, the functioning portion 145 is brought into contact with the inner side faces of the bottom pieces 114*a*, 114*b* at faces thereof. Thereby, the inner side portion of the bottom piece 114 brought into sliding contact with a vertical edge of the door glass DG in opening and closing the door glass DG is constituted by the functioning portion 145.

However, according to the second embodiment, the vertical connecting member 141 is constituted by a material different from that of the upper connecting member 131, the connecting member main body 142 is constituted by olefin species thermoplastic elastomer (TPV: thermoplastic valcanizate) of a dynamic bridging type, and the functioning portion 145 is constituted by polyethylene harder than EPDM. Further, the functioning portion 145 comprising polyethylene is constituted to be thin-walled such that operability of attaching to the channel portion DC of the glass run 1 is not deteriorated by making a rigidity of the bottom portion 114 successively high. Further, according to the embodiment, the connecting portion main bodies 132, 142 and the functioning portions 135, 145 are simultaneously molded for the respective connecting members 131, 141 in correspondence with the respective side portions 102, 103, 104.

By connecting the vehicle exterior side molded member 121 and the vehicle interior side molded member 122 by the connecting members 131, 141 constituted as described above, there is constituted an entire region in a longitudinal direction of the glass run 1 including the upper side portion 2, the front vertical side portion 3, the rear vertical side portion 4 constituting a shape of a section having the main body portion 111 and the seal lips 112, 113 and the like as described above.

Further, according to the embodiment, an end portion on a side of the front vertical side portion 3 of a portion in correspondence with the upper side portion 2 in the vehicle interior side molded member 122 is integrally provided with a projected portion 125 projected from the vehicle interior side bottom piece 114*b* to a side of a direction of being attached to the channel portion DC (upper side). The projected portion 125 is molded simultaneously in subjecting the vehicle interior side molded member 122 to molding. Further, similar to the first embodiment shown in FIG. 1, the projected portion 125 is locked by the channel portion DC in a state of being fitted to the insertion hole 126 formed at the channel portion DC in a state of being attached to the channel portion DC of the glass run 1. Thereby, a situation that the glass run 1 is shifted to move to the rear side when the door glass DG is closed (when the door glass DG is brought into contact with the bottom portion 114 of the upper side portion 2) can be prevented.

As described above in details, the entire region in the longitudinal direction of the glass run 1 is constituted by molding the vehicle exterior side molded member 121 and the vehicle interior side molded member 122 to divide the glass run 1 to the vehicle interior side and the vehicle exterior side and connecting these by the connecting members 131, 141. Therefore, there can be avoided a situation in which a connecting line connecting molded members contiguous to each other appears in an appearance as in a case of constituting a glass run by connecting a plurality of molded members in a longitudinal direction. Further, portions of the glass run 1 which appear in the appearance in the state of being attached to the channel portion DC (sash portion DS) can be constituted by a single material, and therefore, there can be avoided a situation in which a difference in color/glaze is partially brought about in a longitudinal direction (peripheral direction) of the glass run 1 as in connecting an extruded member and the molded member. As a result, an appearance quality is promoted. Further, a concern that a stepped difference is formed in the longitudinal direction of the glass run 1 can be avoided and a sealing performance is promoted.

Further, the glass run 1 is constituted by connecting the vehicle exterior side molded member 121 and the vehicle interior side molded member 122 which are subjected to molding separately from each other, and therefore, it is not necessary to constitute a developed shape of considerably widening the vehicle exterior side wall portion 115 and the vehicle interior side wall portion 116, and in being attached to the channel portion DC, a shape by which the sectional shape is not to be deformed considerably can be constituted. Therefore, the state of attaching the glass run 1 to the channel portion DC can be stabilized (sealing performance is promoted) and the like. Further, a degree of freedom of product design is higher in a molded member than in the extruded member, and therefore, for example, even when a sectional shape at a particular portion is made to differ, the specific portion can easily be molded by molding. Therefore, a situation that an operation is separately needed for making the sectional shape differ at the particular portion can be avoided, and a productivity is promoted. Further, although according to the embodiment, a portion of the glass run 1 downward from the belt line (lower portion of rear vertical side portion 4 and front vertical side portion 3) is constituted by a shape omitting the design lips 117, 118, also in this case, the glass run 1 can be formed simultaneously with other portion in subjecting the vehicle exterior side molded member 121 and the vehicle interior side molded member 122 to molding without carrying out a separate operation of cutting the design lips 117, 118 or the like.

Further, according to the embodiment, the connecting members 131, 141 for connecting the vehicle exterior side molded member 121 and the vehicle interior side molded member 122 are provided with the functioning portions 135, 145 constituting the inner side portion of the bottom portion 114 in the state of connecting the vehicle exterior side molded member 121 and the vehicle interior side molded member 122.

Further in details, the functioning portion 135 of the upper connecting member 131 provided at the upper side portion 2 is constituted by a foamed member. Therefore, an impact by butting the door glass DG can be absorbed, as a result, impact sound in closing the door glass DG can be restrained.

Further, the functioning portions 145 of the vertical connecting members 141 provided at the vertical side portions 3, 4 are constituted by polyethylene harder than the vehicle exterior side molded member 121 and the vehicle interior side molded member 122 constituted by EPDM. Therefore, a performance of sliding the door glass DG and wear resistance against sliding contact with the door glass DG can be promoted. Further, the operability is promoted than in a case of pasting the polyethylene tape to the inner side of the bottom portion while widening the two side wall portions, or forming a sliding layer by coating a sliding agent.

Further, the invention is not limited to a described content of the above-described embodiment but may be embodied as, for example, follows. Naturally, other application examples and change examples which are not exemplified in the following can naturally be embodied.

Figure 13:
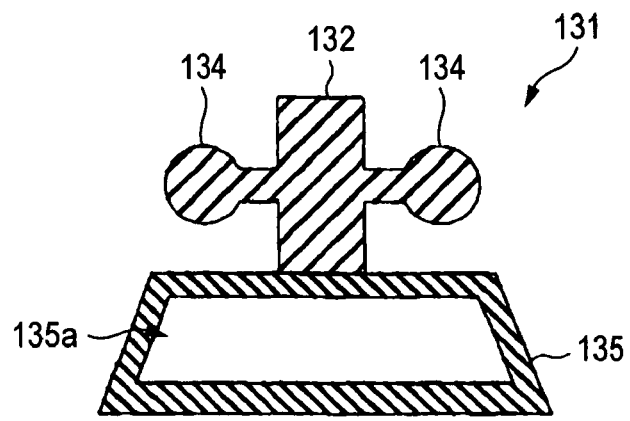
FIG. 13 is a sectional view showing a connecting member in other example.

(a) As shown by FIG. 13, the functioning portion 35 of the upper connecting member 31 may be constituted by a hollow shape. Thereby, a hollow portion 34a is formed at the bottom portion brought into contact with the upper edge portion of the door glass DG when the door glass DG is closed. In this case, an impact based on contact with the door glass DG can be absorbed by a repulsive force of the hollow portion 35a, and impact sound when the door glass DG closed can firmly be restrained.

Figure 14:
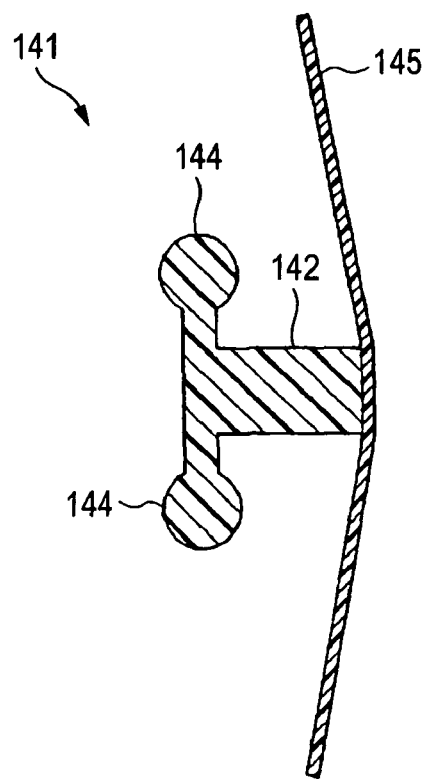
FIG. 14 is a sectional view showing a connecting member in other example.

(b) As shown by FIG. 14, the functioning portion 145 in the plate-like shape of the vertical connecting member 141 provided at the rear vertical side portion 4 (front vertical side portion 3) may be constituted to be extended to be inclined to a side of the engaging portion 144 in a side direction of the connecting portion main body 142 from a portion thereof connected to the connecting portion main body 142 in a state before connecting the vehicle exterior side molded member 121 and the vehicle interior side molded member 122. In this case, inner side faces of the functioning portion 145 and the bottom pieces 114a, 114b can be brought into press contact with each other in bringing about the state of connecting the vehicle exterior side molded member 121 and the vehicle interior side molded member 122. Therefore, the functioning portion 145 can be prevented from being floated up from the bottom pieces 114a, 114b and a performance of sliding the door glass DG caused by being floated up can be prevented from being deteriorated.

Figure 15A:
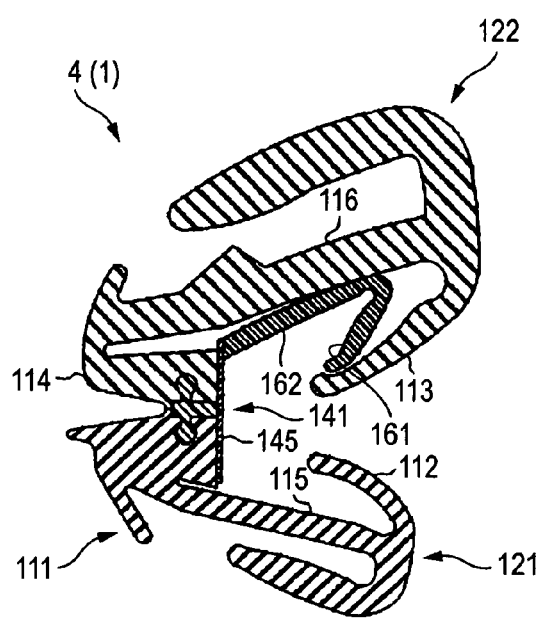
FIGS. 15A, 15B are sectional view both showing connecting members in other example.
Figure 15B:
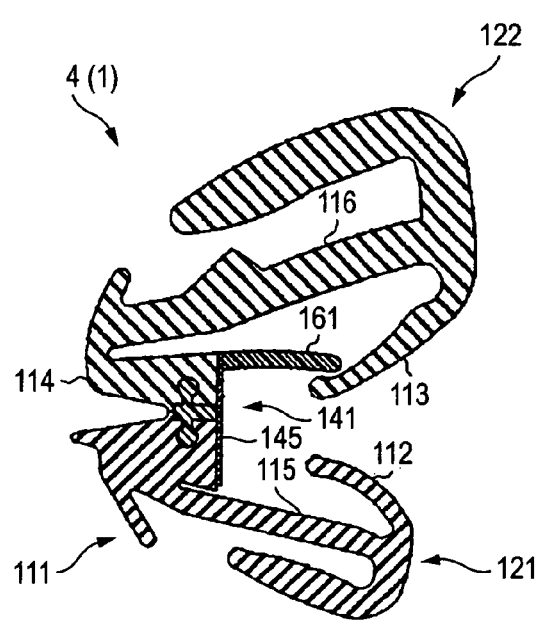

(c) As shown by FIGS. 15A, 15B, there may be provided a sublip 161 capable of being brought into contact with a face (rear face) of the vehicle interior side seal lip 113 on a side opposed to the door glass sliding face with regard to the functioning portion 145 of the vertical connecting member 141 provided at the rear vertical side portion 4 (front vertical side portion 3). Further, the functioning portion 145 of the vertical connecting member 141 shown in FIG. 15A includes an extended portion 162 extended from the tip end portion of the vehicle interior side seal lip 113 to a side of the tip end portion of the inner side portion 116 to be along an inner face of the vehicle interior side wall portion 116 from an end portion of the plate-like member to a side of the vehicle interior side wall portion 116, and the sublip 161 extended from the tip end portion of the extended portion 162 linearly to be inclined to a side of bottom portion 114 to be directed to an inner peripheral side of the main body portion 111 and capable of being brought into contact with the rear face of the tip end portion of the vehicle interior side seal lip 113. Further, in FIG. 15B, the functioning portion 145 is constituted by extending the sublip 161 capable of being brought into contact with the rear face of the tip end portion of the vehicle interior side seal lip 112 from the end portion of the plate-like portion on the side of the vehicle interior side wall portion 116. By providing the sublip 161 in this way, when the door glass DG is going to be displaced to the vehicle interior side, the vehicle interior side 113 and the sublip 161 support to press back the door glass DG in cooperation with each other while being bent. Therefore, rattle of the door glass DG can be restrained. Further, the vehicle interior side seal lip 113 is brought into a state of being pinched by the sublip 161 and the door glass DG, and therefore, a situation in which the vehicle interior side seal lip 113 is vibrated in the vehicle width direction and the vehicle interior side seal lip 113 is separated from the door glass DG can be prevented. Therefore, the sealing performance can be prevented and a sound blocking performance can be promoted.

Figure 16:
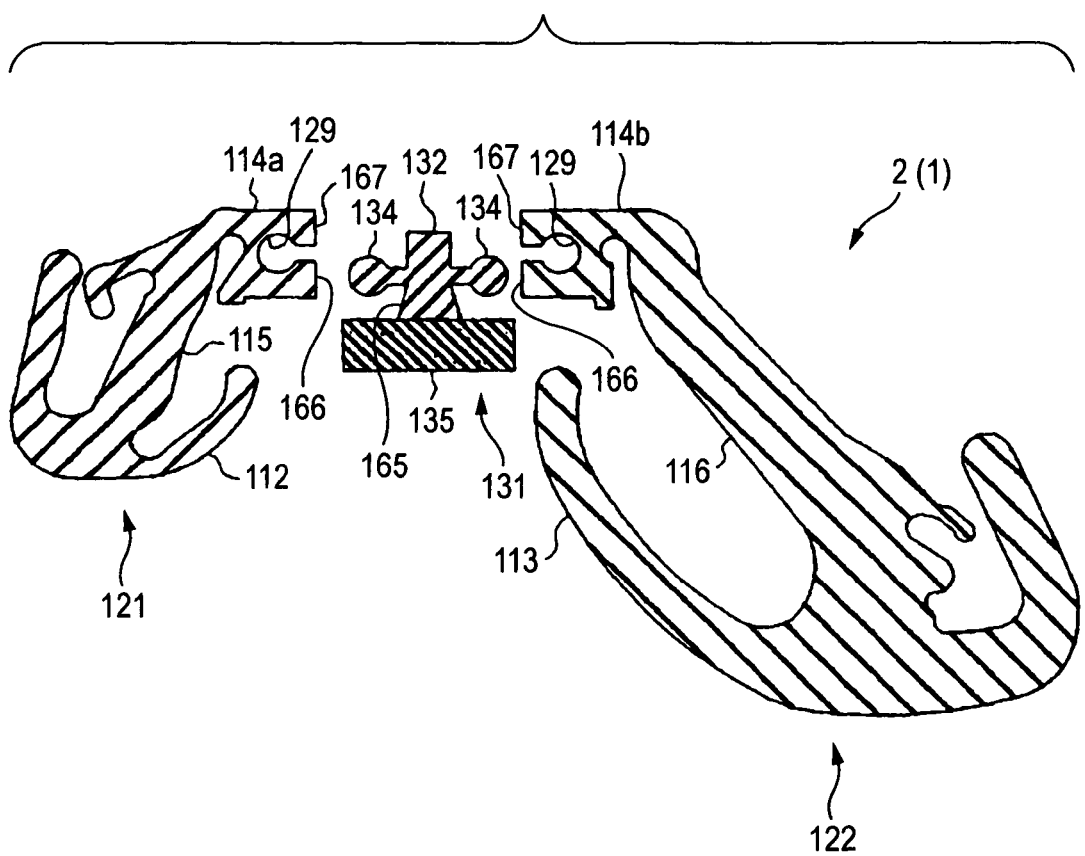
FIG. 16 is a sectional view showing a disassembled state of a glass run in other example.

(d) As shown by FIG. 16, for example, a portion of the connecting portion main body 132 of the upper connecting member 131 provided at the upper side portion 2 disposed between the engaging portion 134 and the functioning portion 135 may be constituted by a taper portion 165 widening a width thereof to the side of the functioning portion 135. However, with regard to respective tip end faces of the vehicle exterior side bottom piece 114a and the vehicle interior side bottom piece 114b, angles of inclination thereof are not changed in correspondence with deformation of the connecting portion main body 132 and the respective tip end faces are extended orthogonally to inner and outer side faces of the vehicle exterior side bottom piece 114a and the vehicle interior side bottom piece 114b. By adopting such a constitution, in the state of connecting the vehicle exterior side molded member 121 and the vehicle interior side molded member 122, a pressure applied to a portion 166 disposed on the inner peripheral side of the main body portion 111 of the engaged portion 129 in the respective tip end faces of the vehicle exterior side bottom piece 114a and the vehicle interior side bottom piece 114b becomes larger than a pressure applied to a portion 167 disposed on the outer peripheral side of the main body portion 111 of the engaged portion 129. Therefore, a force of more or less opening the two side wall portions 112, 113 is operated to the glass run 1. Therefore, in the state of fitting the glass run 1 to the channel portion DC (sash portion DS), the two side wall portions 112, 113 are brought into press contact with each other by an inner peripheral face of the channel portion DC. As a result, a state of attaching the glass run 1 to the channel portion DC can be stabilized.

(e) Although according to the above-described embodiment, the engaged portions 129 are formed at the respective tip end faces of the vehicle exterior side bottom piece 114a and the vehicle interior side bottom piece 114b, and the connecting portion main bodies 132, 142 of the upper connecting member 131, the vertical connecting member 141 are arranged to be pinched between the tip end portion of the vehicle exterior side bottom piece 114a and the tip end portion of the vehicle interior side bottom piece 114b, the invention is not particularly limited to the constitution. That is, the glass run 1 having the main body portion 111 and the pair of seal lips 112, 113 may be able to be constituted by connecting the vehicle exterior side molded member 121 and the vehicle interior side molded member 121 by the connecting members 131, 141, constituting at least an inner side portion of the bottom portion 114 by the connecting members 131, 141, and bringing the vehicle exterior side molded member 121 and the vehicle interior side molded member 122 into the connected state by the connecting members 131, 141.

Figure 17:
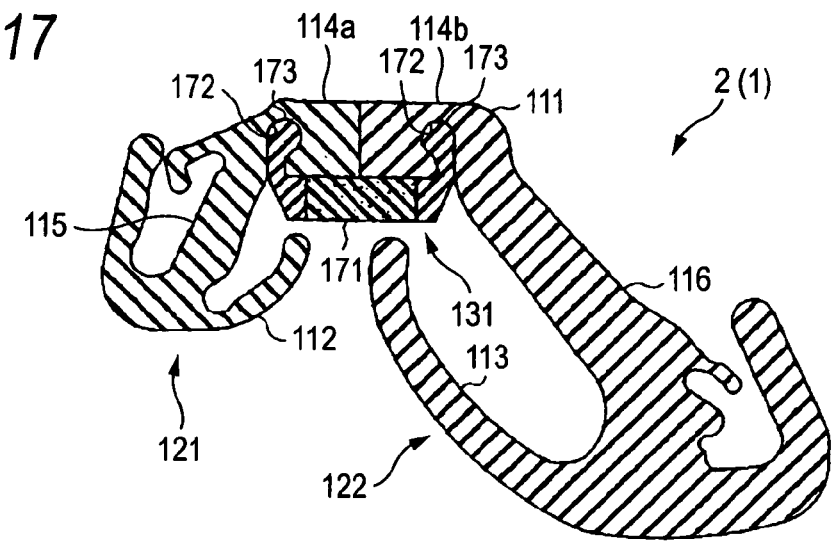
FIG. 17 is a sectional view showing a glass run in other example.

For example, there may be constructed a constitution in which the upper connecting member 131 in correspondence with the upper side portion 2 is provided with a contact portion 171 and an engaging projection 173 as shown by FIG. 17. In this case, the contact portion 171 is constituted by, for example, sponge EPDM, and in a state of bringing the vehicle exterior side molded member 121 and the vehicle interior side molded member 122 into contact with each other, the inner side faces of the vehicle exterior side bottom piece 114a and the vehicle interior side bottom piece 114b are brought into contact with each other. Further, the engaging projections 173 are projected from the both sides of the contact portion 171 to the sides of the vehicle exterior side bottom piece 114a and the vehicle interior side bottom piece 114b, and are fitted to be engaged to notched portions 172 formed at boundary portions of the vehicle exterior side bottom piece 114a, the vehicle interior side bottom piece 114a and the vehicle exterior side wall portion 115, the vehicle interior side wall portion 116.

Figure 18:
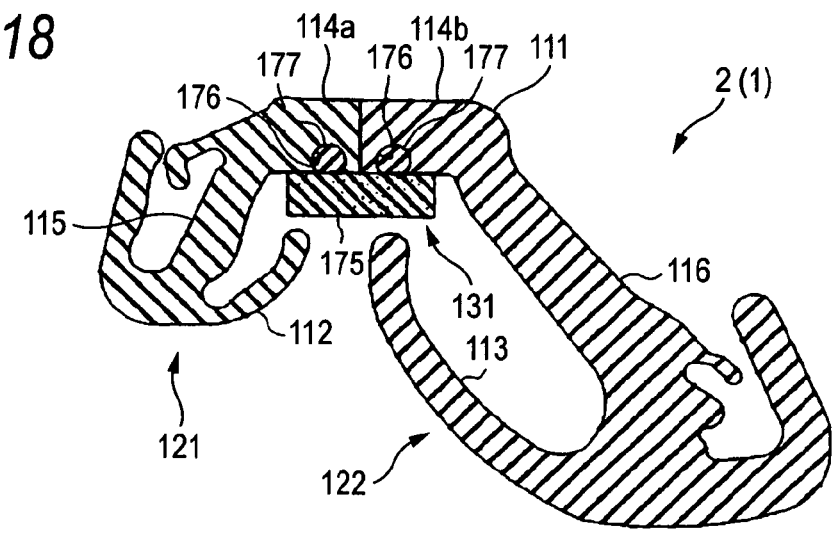
FIG. 18 is a sectional view showing a glass run in other example.

Further, for example, as shown by FIG. 18, there may be constructed a constitution in which an upper connecting member 131 in correspondence with the upper side portion 2 is provided with a contact portion 175 and engaging projections 177 projected from the contact portion to the sides of the vehicle exterior side bottom piece 114a and the vehicle interior side bottom piece 114b and fitted to be engaged with engaging holes 176 as engaged portions formed at inner side faces of the vehicle exterior side bottom piece 114a and the vehicle interior side bottom piece 114b.

Figure 19:
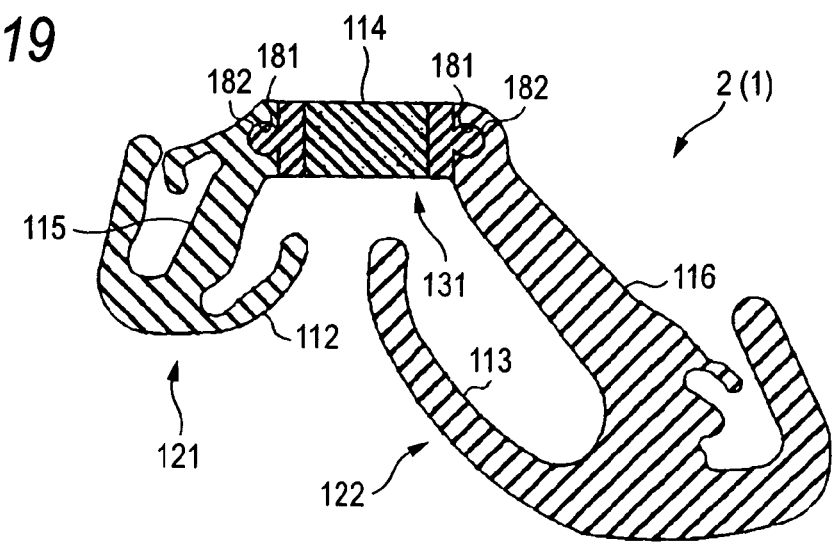
FIG. 19 is a sectional view showing a glass run in other example.

Further, for example, as shown by FIG. 19, the vehicle exterior side molded member 121 may be constituted to include the vehicle outer seal lip 112 and the vehicle exterior side wall portion 115, the vehicle interior side molded member 122 is constituted to include the vehicle interior side seal lip 113 and the vehicle interior side wall portion 116, the upper connecting member 131 may be constituted to constitute the bottom portion 114. In this case, for example, engaging holes 181 as engaged portions are formed at the vehicle exterior side wall portion 115 and the vehicle interior side wall portion 116, and engaging projections 182 provided at the both side end portions of the upper connecting member 131 are engaged with the engaging holes 181.

(f) Although according to the embodiment, the connecting members 131, 141 are divided in three to respectively correspond to the upper side portion 2, the front vertical side portion 3, and the rear vertical side portion 4, the invention is not particularly limited to such a constitution. For example, the upper connecting members 31 and the vertical connecting members 141 may be formed continuously over an entire region in the longitudinal direction of the glass run 1. Further, for example, the upper connecting member 131 and the vertical connecting members 131 may be provided intermittently, partially to the upper side portion 2, the front vertical side portion 3, and the rear vertical side portion 4.

Further, with regard to corner portions of the glass run 1, connecting members of only the connecting portion main bodies 132, 142 omitting the functioning portions 135, 145 may be arranged, engaging portions for engaging the both members to the vehicle exterior side bottom piece 114a and the vehicle interior side bottom piece 114b may be provided without arranging the connecting portions 131, 141, or the tip end portion of the vehicle exterior side bottom piece 114a and the tip end portion of the vehicle interior side bottom piece 114b may be butted to each other, and the vehicle exterior side bottom piece 114a and the vehicle interior side bottom piece 114b may be connected by a tape material or an adhesive.

Further, according to the embodiment, constitutions of the functioning portions 135, 145 differ at the upper side portion 2 and the vertical side portions 3, 4, and therefore, it is difficult to simultaneously mold the connecting main body 132 and the functioning portion 135 such that the connecting members 131, 141 are made to be continuous over the entire region in the longitudinal direction of the glass run 1. Therefore, when the connecting members 131, 141 are intended to be formed to be continuous over the entire region in the longitudinal direction of the glass run 1, for example, only the connecting portion main bodies 132, 142 may be molded over the entire region in the longitudinal direction of the glass run 1 by TPO or the like and the functioning portions 135, 145 in correspondence with the respective side portions may be bonded thereto at a later stage.

(g) The sectional shape of the glass run 1 is not particularly limited but the glass run 1 may be provided with at least the main body portion 111 and the pair of seal lips 112, 113. For example, the design lips 117, 118 may be omitted.

Further, although cut portions (notches) are formed at the boundary portions of the vehicle exterior side wall portion 115 and the vehicle interior side wall portion 116 in FIGS. 10, 11 and the like although not particularly referred to in the above-described embodiment, the cut portions may be omitted. Inherently, the cut portion is formed in consideration of availability or the like in facilitating to narrow the both side wall portions, coating the sliding agent to the inner side face of the bottom portion 114 or pasting the polyethylene tape in being attached to the channel portion DC since in the background art of simultaneously forming the main body portion, the vehicle exterior side seal lip, and the vehicle interior side seal lip, it is necessary to mold the glass run by the developed shape. In this respect, when the glass run 1 is divided to the vehicle exterior side molded member 121 and the vehicle interior side molded member 122 to be subjected to molding, it is not necessary to constitute the above-described developed shape or carry out an operation by widening the lip portions. Therefore, particular hazard is not brought out even when the cut portion is omitted.

(h) Although according to the embodiment, the main body portion 111 and the seal lips 112, 113 (vehicle exterior side molded member 121 and the vehicle interior side molded member 122) and the upper connecting member 131 are constituted by EPDM, these may be constituted by other material of olefin species thermoplastic elastomer (TPO) or the like. However, it is preferable that the functioning portion 135 of the upper connecting member 131 is provided with the function capable of absorbing an impact caused by contact with the door glass DG. Further, although the connecting portion main body 142 of the vertical connecting member 141 is constituted by TPV, and the functioning portion 145 is constituted by polyethylene, these may be constituted by other material of polypropylene or the like. However, it is preferable to constitute the functioning portion 145 of the vertical connecting member 141 by a material harder than that of the bottom pieces 114a, 114b. Further, the operability in connecting the vehicle exterior side bottom piece 114a and the vehicle interior side bottom piece 114b is promoted by constituting the connecting members 131, 141 (connecting main bodies 132, 142) and the respective tip end portions of the vehicle exterior side bottom piece 114a and the vehicle interior side bottom piece 114b formed with the engaged portion 129 by a material harder than that of the vehicle exterior side molded member 121 and the vehicle interior side molded member 122.

Further, although according to the embodiment, the detailed explanation has been given particularly with regard to the glass run 1 of the front door, a glass run of a rear door may be constituted similarly by connecting the vehicle exterior side molded member 121 and the vehicle interior side molded member 122 by the connecting members 131, 141.

(i) Although not particularly referred to in the above-described embodiment, there may be adopted a constitution for preventing the vehicle exterior side molded member 121 and the vehicle interior side molded member 122 from being shifted to move in the longitudinal direction glass run. For example, a restricting projected portion projected from the vehicle exterior side bottom piece 114a to the side of the vehicle interior side bottom piece 114b may be provided, and a restricting recess portion for engaging with the restricting projected portion may be formed at the vehicle interior side bottom piece 114b.

Third Embodiment

Figure 20:
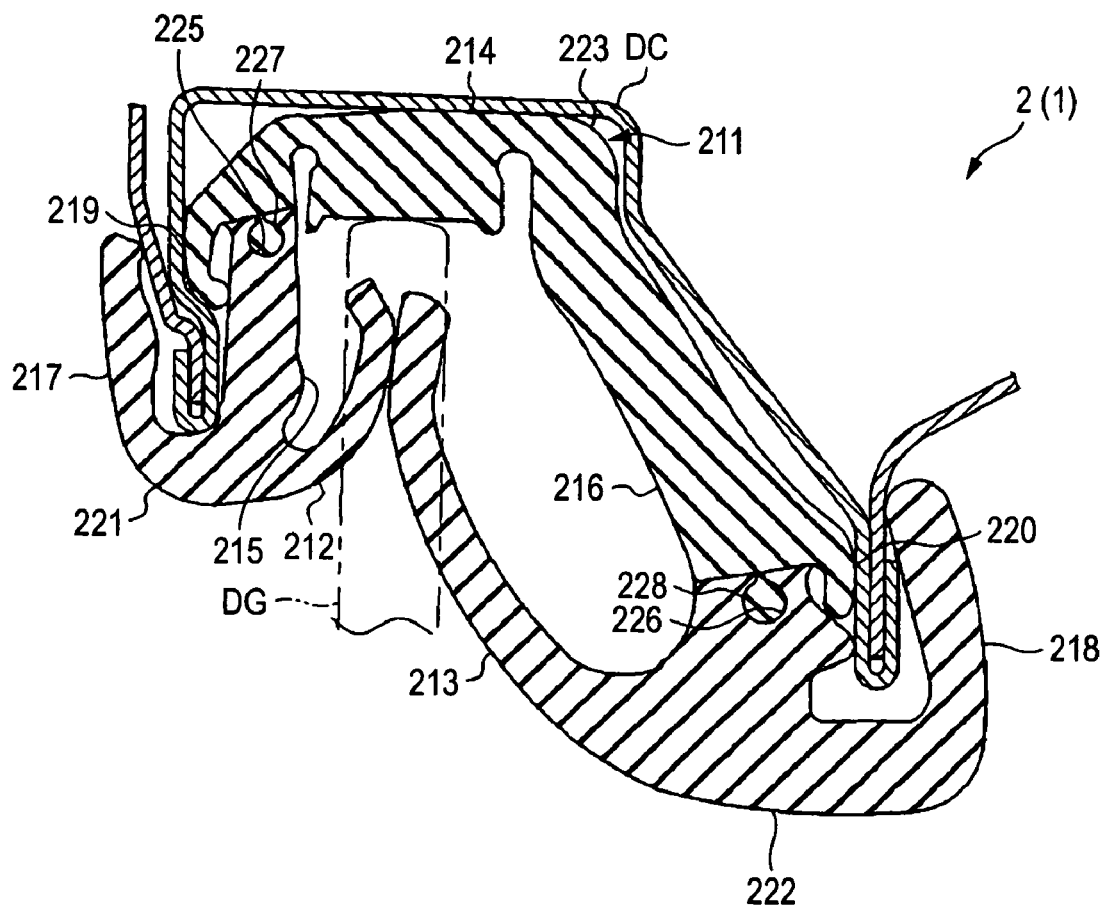
FIG. 20 is a sectional view showing a glass run (third embodiment) brought into a state of being attached to a channel portion.
Figure 21:
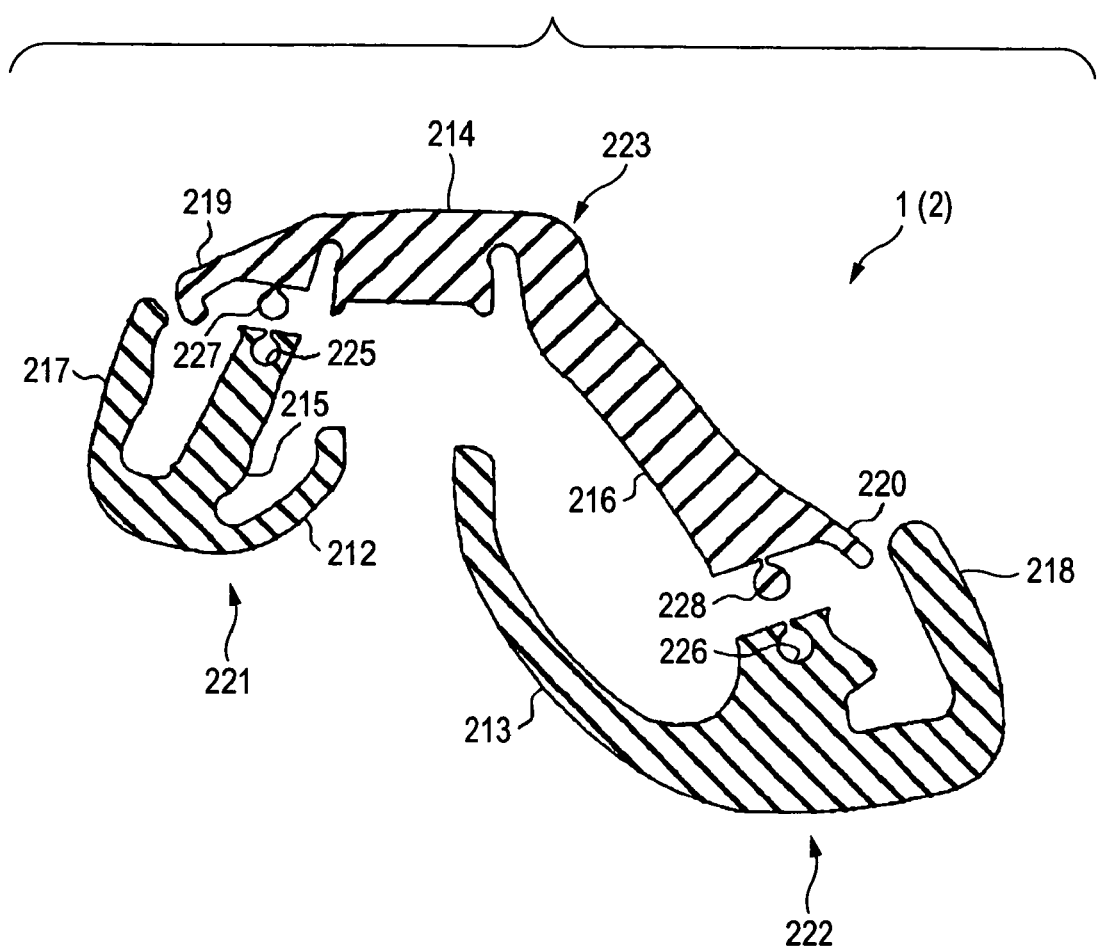
FIG. 21 is a sectional view showing the glass run brought into a disassembled state.

Third embodiment will be explained in reference to the drawings as follows. FIG. 20 is a sectional view showing a glass run brought into a state of being attached to a sash portion. FIG. 21 is a sectional view of a glass run brought into a disassembled state.

Figure 22:
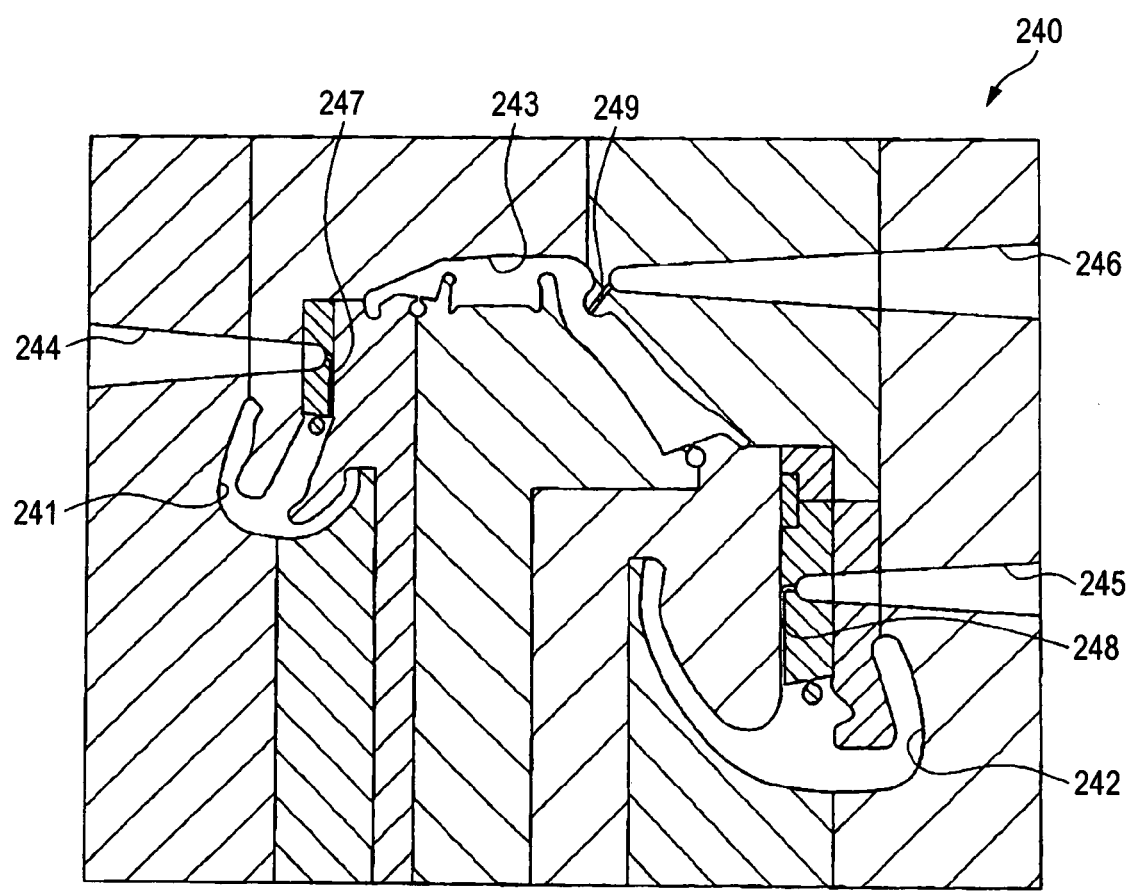
FIG. 22 is a sectional view showing a molding apparatus for molding a vehicle exterior side molded member, a vehicle interior side molded member, and a base portion side molded member.

As shown by FIG. 22, FIG. 21, the upper side portion 2 includes a main body portion 211 and a vehicle exterior side seal lip 212 and a vehicle interior side seal lip 213. The main body portion 211 includes a bottom portion 214 fitted to a channel portion DC and a vehicle exterior side wall portion 215 and a vehicle interior side wall portion 216 extended from the bottom portion 214 to constitute a section substantially in a U-shape as a whole. The vehicle exterior side seal lip 212 is extended from a tip end of the vehicle exterior side wall portion 215 to an inner peripheral side of the main body portion 211, and the vehicle interior side seal lip 213 is extended from a tip end of the vehicle interior side wall portion 216 to the inner peripheral side of the main body portion 211. Further, in a state of closing the door glass DG, the vehicle exterior side seal lip 212 is brought into press contact with an outer side face of the door glass DG, and the vehicle interior side seal lip 213 is brought into press contact with an inner side face of the door glass DG. Thereby, the vehicle exterior side and the vehicle interior side of the door glass DG are respectively sealed.

Further, there are provided a vehicle exterior side molding lip 217 extended from the tip end of the vehicle exterior side wall portion 215 to an outer side (vehicle exterior side) of the main body portion 211, a vehicle interior side molding lip 218 extended from the tip end of the vehicle interior side wall portion 216 to an outer side (vehicle interior side) of the main body portion 211. Further, the glass run 1 is attached to the channel portion DC by making the main body portion 211 disposed on the inner peripheral side of the channel portion DC having a section substantially in a U-shape and inserting the channel portion DC (flange portion) to between the outer side wall portion 215 and the vehicle exterior side molding lip 217 and between the vehicle interior side wall portion 216 and the vehicle interior side molding lip 218.

Further, there are provided a vehicle exterior side retaining lip 219 which is extended from an outer side face of the vehicle exterior side wall portion 215 to the vehicle exterior side and at least a tip end portion of which is disposed between the vehicle exterior side wall portion 215 and the vehicle exterior side molding lip 217, and a vehicle interior side retaining lip 220 which is extended from an outer side face of the vehicle interior side wall portion 216 to the vehicle interior side and at least a tip end portion of which is disposed between the vehicle interior side wall portion 216 and the vehicle interior side molding lip 218. By presence of the retaining lips 219, 220, a force of pinching the channel portion DC between the respective side wall portions 215, 216 and the respective molding lips 217, 218 can be increased and a state of attaching the glass run 1 to the sash portion DC is made to be stabilized.

Further, also with regard to the front vertical side portion 3 and the rear vertical side wall portion 4, the main body portion 211, the pairs of seal lips 212, 213, the molding lips 217, 218, and the retaining lips 219, 220 and the like are provided. Further, the vehicle exterior side seal lip 212 is constituted to be smaller (shorter) than the vehicle interior side seal lip 213. Thereby, the door glass DG is shifted to the vehicle exterior side to achieve flash surface formation.

Now, the glass run 1 according to the embodiment is constituted by three molded members. Further in details, the glass run 1 is constituted by a vehicle exterior side molded member 221 in which the vehicle exterior side seal lip 212, the vehicle exterior side molding lip 212, and a large portion of the vehicle exterior side wall portion 215 are integrally subjected to molding, a vehicle interior side molded member 222 in which the vehicle interior side seal lip 213, the vehicle interior side molded member 218 and a portion of the vehicle interior side wall portion 216 are integrally subjected to molding, and a base portion side molded member 223 (base portion side molded member) in which a portion of the main body portion 211 which is not included in the vehicle exterior side molded member 221 and the vehicle interior side molded member 222, the vehicle exterior side retaining lip 219, and the vehicle interior side retaining lip 220 are integrally subjected to molding. According to the embodiment, the vehicle exterior side molded member 221, the vehicle interior side molded member 222, and the base portion side molded member 223 are made to be continuous over an entire region in a longitudinal direction of the glass run 1.

In addition thereto, the vehicle exterior side molded member 221 and the vehicle interior side molded member 222 include engaging recess portions 225, 226 at boundary portions thereof with the base portion side molded member 223. Further, the base portion side molded member 223 includes engaging projected portions 227, 228 fitted to be engaged with the corresponding engaging recess portions 225, 226 at respective boundary portions with the vehicle exterior side molded member 221 and the vehicle interior side molded member 22. Further, by engaging the engaging projected portions 217, 218 with the engaging recess portions 225, 226 the vehicle exterior side molded member 221 and the vehicle interior side molded member 222 and the base portion side molded member 223 are integrated. Further, according to the embodiment, the glass run 1 is separated at respective root portions of the retaining lips 219, 220, and boundary portions of faces of the retaining lips 219, 220 on sides of tip end portions of the side wall portions 215, 216 and the base portion side molded member 223 provided with an engaging projected portions 227, 228 are made to be continuous faces.

Further, the engaging projected portions 227, 228 include diameter enlarging portions having sections substantially in a circular shape, the engaging recess portions 225, 226 are constituted by shapes in correspondence therewith, and therefore, by engaging the engaging projected portions 227, 228 with the engaging recess portions 225, 226, a situation that the vehicle exterior side molded member 221 and the vehicle interior side molded member 222 are detached from the base portion side molded member 223 in direction of extending the respective side wall portions 215, 216 is made to be difficult to be brought about.

Further, the engaging recess portions 225, 226 and the engaging projected portions 227, 228 are intermittently formed in longitudinal directions of the vehicle exterior side molded member 221, the vehicle interior side molded member 222, and the base portion side molded member 223 although illustration thereof is omitted. That is, although the engaging recess portions 225, 226 are extended in groove-like shapes along the longitudinal directions of the vehicle exterior side molded member 221 and the vehicle interior side molded member 222, the engaging recess portions 225, 226 are not continuously formed but separated by partitioning wall portions formed to partition the groove portions at portions thereof. Also the engaging projected portions 227, 228 are not continuously formed in the longitudinal direction of the base portion side molded member 223 but the engaging projected portions 227, 228 are omitted at portions thereof in correspondence with the partitioning wall portions. Further, by engaging the engaging projected portions 227, 228 with the engaging recess portions 225, 226, respective end portions of the engaging projected portions 227, 228 constituting cut portions are brought into contact with the partitioning wall portions, and therefore, a situation that the vehicle exterior side molded member 221 and the vehicle interior side molded member 222 are shifted relative to the base portion side molded member 223 in the longitudinal direction of the base portion side molded member 223 can be prevented. Further, according to the embodiment, the vehicle exterior side molded member 221, the vehicle interior side molded member 222, and the base portion side molded member 223 are formed by molding, and therefore, these can be molded comparatively easily even when sectional shapes thereof are made to differ partially as described above.

In addition thereto, similar to the first embodiment shown in FIG. 1, an end portion of a portion of the base portion side molded member 223 in correspondence with the upper side portion 2 on a side of the front vertical side portion 3 is integrally provided with a projected portion 231 projected to a side (upper side) in a direction of being attached to the channel portion DC. The projected portion 231 is molded simultaneously in subjecting the base portion side molded member 213 to molding. Further, the projected portion 231 is locked by the channel portion DC in a state of being fitted to an insertion hole 232 formed at the channel portion DC in a state of being attached to the channel portion DC of the glass run 1. Thereby, when the door glass DG is closed (when the door glass DG is brought into contact with the bottom portion 214 of the upper side portion 2), a situation that the glass run 1 is shifted to move to a rear side can be prevented.

Further, a sliding layer is formed at an inner side face of the bottom portion 214 (a face on an inner peripheral side of the main body portion 211) to promote a performance of sliding the door glass DG.

Next, a method of fabricating the glass run 1 will be explained. First, the vehicle exterior side molded member 221, the vehicle interior side molded member 222, and the base portion side molded member 223 are subjected to molding by using a molding apparatus 240 shown in, for example, FIG. 22. That is, the molding apparatus 240 forms a vehicle exterior side cavity 241, a vehicle interior side cavity 242, and a base portion side cavity 243 for respectively molding the vehicle exterior side molded member 221, the vehicle interior side molded member 222, and the base portion side molded member 223 by providing a plurality of molds. Further, EPDM brought into a plasticized state is injected to fill in the respective cavities 241, 242, 243 by injecting means, not illustrated, by way of sprues 244, 245, 246 and gates 247, 248, 249. Thereafter, EPDM is vulcanized to solidify and the vehicle exterior side molded member 221, the vehicle interior side molded member 222, and the base portion side molded member 223 which are molded by opening the molds after having solidified EPDM are detached from the molding apparatus 240.

The vehicle exterior side molded member 221, the vehicle interior side molded member 222, and the base portion side molded member 223 are fabricated as described above. As described above, the respective molded members 221, 222, 223 are formed continuously over an entire region in a longitudinal direction of the glass run 1, according to the embodiment, also the molding lips 217, 218 and the retaining lips 219, 220 are formed continuously over the upper side portion 2, the front vertical side portion 3, and the rear vertical side portion 4. Further, with regard to the retaining lips 219, 220 and the molding lips 217, 218, sectional shapes constituted by cutting the respective molded members 223, 221, 222 in directions orthogonal to the longitudinal directions are constituted to stay substantially the same at any portions in the longitudinal directions of respective molded members 223, 221, 222.

Successively, the vehicle exterior side molded member 221, the vehicle interior side molded member 222, and the base portion side molded member 223 subjected to molding as described above are integrated. That is, the engaging projected portion 217 of the base portion side molded member 223 is fitted to the engaging recess portion 225 of the vehicle exterior side molded member 221 and the engaging projected portion 228 of the base portion side molded member 223 is fitted to the engaging recess portion 226 of the vehicle interior side molded member 222. Thereby, there is constituted an entire region in the longitudinal direction of the main body of the glass run 1 constituting a sectional shape including the main body portion 211 and the seal lips 212, 213 and the like as described above and including the upper side portion 2, the front vertical side portion 3, the rear vertical side portion 4, and connecting portions (corner portions) of the upper side portion 2 and the front vertical side portion 3, the rear vertical side portion 4. According to the embodiment, at any portion in the longitudinal direction of the glass run 1, a positional relationship between the retaining lips 219, 220 and the molding lips 217, 218 in correspondence therewith (distances between the retaining lips 219, 220 and the molding lips 217, 218 and the like) are constituted to stay substantially the same.

Thereafter, the glass run 1 is fabricated by forming a sliding layer at an inner side face or the like of the bottom portion 211 (for example, pasting polyethylene (PE) tape).

As described above in details, according to the embodiment, the entire region in the longitudinal direction of the glass run 1 comprising the upper side portion 2, the front vertical side portion 3, and the rear vertical side portion 4 is constituted by integrating the vehicle exterior side molded member 221 and the vehicle interior side molded member 212 and the base portion side molded member 223. That is, the glass run 1 can be constituted only by the molded member. Therefore, for example, a situation that a line of connecting an extruded member and a molded member appears in an appearance as in a case of constituting the glass run 1 by connecting the extruded member and the molded member in the longitudinal direction can be avoided. Further, a situation that a difference is brought about in color/glaze partially in the longitudinal direction (peripheral direction) of the glass run 1 can be avoided. As a result, an appearance quality is promoted. Further, a concern that a stepped difference is formed in the longitudinal direction of the glass run 1 can be avoided and a sealing performance is promoted.

Further, the vehicle exterior side seal lip 212 is provided at the vehicle exterior side molded member 221, the vehicle interior side seal lip 213 is provided at the vehicle interior side molded member 222, and therefore, it is not necessary to mold the glass run 1 to constitute a developed shape of considerably widening the vehicle exterior side wall portion 215 and the vehicle interior side wall portion 216, and the glass run 1 can be constituted by a shape by which a sectional shape needs not to deform considerably in being attached to the channel portion DC (sash portion DS). Therefore, a state of attaching the glass run 1 to the channel portion DC can be stabilized and the sealing performance can be promoted.

Further, according to the embodiment, the retaining lips 219, 220 and the molding lips 217, 218 are separately molded. Therefore, there can be avoided a situation that it is difficult to ensure a strength of a mold, or positional relationships or shapes of the retaining lips 219, 220 and the molding lips 217, 218 are restricted as in a case of subjecting, for example, the molding lip and the retaining lip integrally to molding. Therefore, a force of pinching the channel portion DC by the molding lips 217, 218 and the retaining lips 219, 220 can sufficiently be ensured without being accompanied by a particular difficulty, as a result, a state of attaching the glass run 1 to the channel portion DC can further firmly be stabilized.

Further, according to the embodiment, the retaining lips 219, 220 are continuously formed over the upper side portion 2, the front vertical side portion 3, and the rear vertical side portion 4, and constituted such that sectional shapes thereof substantially stay the same at any portions, and therefore, the state of being attached to the channel portion DC can further firmly be stabilized.

Further, according to the embodiment, the engaging projected portions 227, 228 and the engaging recess portions 225, 226 are provided and the vehicle exterior side molded member 221 and the vehicle interior side molded member 222 and the base portion side molded member 223 are directly integrated. Therefore, in comparison with the case of connecting the molded members 221, 222, 223 by an adhesive, it is not necessary that a time period is required until drying the adhesive, or it is necessary to hold a state of bringing faces of the molded members 221, 222, 223 coated with the adhesive into press contact with each other, and therefore, a fabrication operability can be restrained from being deteriorated.

Further, the respective molded members 221, 222, 223 are restrained from being moved to shift in the longitudinal direction of the glass run 1, a thickness direction of the vehicle exterior side wall portion 215 or the vehicle interior side wall portion 216, and a direction of extending the vehicle exterior side wall portion 215 or the vehicle interior side wall portion 216 by engaging the engaging projected portions 227, 228 to the engaging recess portions 225, 226 and integrating the vehicle exterior side molded member 221, the vehicle interior side molded member 222, and the base portion side molded member 223. Therefore, the molded members 221, 222, 223 can precisely be integrated and the integrated state can stabilized. Therefore, there can be prevented a concern or the like that the sealing performance is deteriorated, a state of being attached to the attaching portion is deteriorated, attaching operability is deteriorated by being caused by positionally shifting the molded members 221, 222, 223.

Further, the invention is not limited to a described content of the embodiment but may be embodied as, for example, follows. Naturally, other application examples, change examples which are not exemplified in the following can naturally be embodied.

(a) Although according to the third embodiment, the invention is embodied with regard to the glass run 1 provided with the vehicle exterior side retaining lip 219 and the vehicle interior side retaining lip 220, the invention is applicable also in a case of omitting the vehicle interior side retaining lip 220. When the vehicle interior side retaining lip 220 is omitted in this way, even when the glass run 1 is not divided into the base portion side molded member 223 and the vehicle interior side molded member 222 as in the above-described embodiment, a molded member having a shape of integrating the base portion side molded member 223 and the vehicle interior side molded member 222 can comparatively easily be subjected to molding. Therefore, the glass run 1 may be constituted by two molded members of the vehicle exterior side molded member 221 and a molded member constituting a portion other than the vehicle exterior side molded member 221.

Further, although according to the third embodiment, the molding lips 217, 218 and the retaining lips 219, 220 are provided in correspondence with each other by one to one relationship, a plurality of retaining lips may be provided in correspondence with one molding lip. Also in this case, it is preferable to provide all of the retaining lips to the base portion side molded member 223 as in the above-described embodiment.

(b) Although according to the embodiment, the vehicle exterior side molded member 221 and the vehicle interior side molded member 222 are integrated to the base portion side molded member 223 by engaging the engaging projected portions 227, 228 to the engaging recess portions 225, 226, the invention is not particularly limited to such a constitution. However, in a state of integrating the vehicle exterior side molded member 221 and the vehicle interior side molded member 222 and the base portion side molded member 223, it is preferable to restrict the respective molded members 221, 222, 223 from being moved to shift from each other in the longitudinal direction of the glass run 1 in the thickness direction of the vehicle exterior side wall portion 215 or the vehicle interior side wall portion 216 and the direction of extending the vehicle exterior side wall portion 215 or the vehicle interior side wall portion 216.

Further, although in the above-described embodiment, the molded members 221, 222, 223 are restricted from being moved to shift in the longitudinal directions by intermittently forming the engaging recess portions 225, 226 and the engaging projected portions 227, 228, the invention is not particularly limited to such a constitution. For example, there may be constructed a constitution in which the engaging recess portions 225, 226 and the engaging projected portions 227, 228 are continuously formed along the longitudinal direction of the glass run 1, separately from the engaging recess portions 215, 216 and the engaging projected portions 227, 228, shift preventing means for preventing a shift in the longitudinal direction of the glass run 1 (for example, a projection and a hole portion in correspondence therewith) may be provided.

(c) Although in the above-described embodiment, a detailed explanation has been given of the glass run 1 of the front door, even a glass run or the like of a rear door may be constituted similarly by the vehicle exterior side molded member 221, the vehicle interior side molded member 222, and the base portion side molded member 223.

Further, the above-described constitution may be adopted for a glass run attached to a door frame of a type in which a channel member having a section substantially a U-shape is not provided between an inner panel and an outer panel constituting the door frame (channel-less structure).

(d) The base portion side molded member 223 according to the above-described embodiment may be formed by extrusion molding. In this case, a sliding layer can simultaneously be formed at the inner side face of the bottom portion 214 in the extrusion molding and a fabrication operability is promoted. However, when the base portion side molded member 223 is formed continuously over the entire region in the longitudinal direction of the glass run 1, there is a concern that the base portion side molded member 223 cannot excellently follow the shapes of the vehicle exterior side molded member 221, the vehicle interior side molded member 222 at portions of the glass run 1 in correspondence with corner portions, and therefore, it is necessary to deal therewith by making such a portion thin-walled or the like. Further, the base side molded member 223 is a portion which does not appear in the appearance, and therefore, even when the base portion side molded member is constituted by connecting a plurality of molded members in the longitudinal direction, there is not a concern of deteriorating the appearance quality.

(e) When urethane is coated, hairy objects are implanted, a polyethylene (PE) tape is pasted, for example, in order to promote performance of sliding the seal lips 212, 213 or the bottom portion 214, the operation may be carried out at a stage of dividing the vehicle exterior side molded member 221 and the vehicle interior side molded member 222 and the base portion side molded member 223. In this case, a situation of constituting an operation while pressing to widen the vehicle exterior side wall portion 215 and the vehicle interior side wall portion 216 as in the case of carrying out the operation after having been integrated can be avoided and the operability is promoted.

(f) Although according to the above-described embodiment, the vehicle exterior side molded member 221, the vehicle interior side molded member 222, and the base portion side molded member 223 are subjected to molding in one motion by using the molding apparatus 240 including the cavities 241, 242, 243 respectively in correspondence with the vehicle exterior side molded member 221, the vehicle interior side molded member 222, and the base portion side molded member 223, naturally, the vehicle exterior side molded member 221, the vehicle interior side molded member 222, and the base portion side molded member 223 may be separately subjected to molding by respectively different molding apparatus.

Fourth Embodiment

Figure 23:
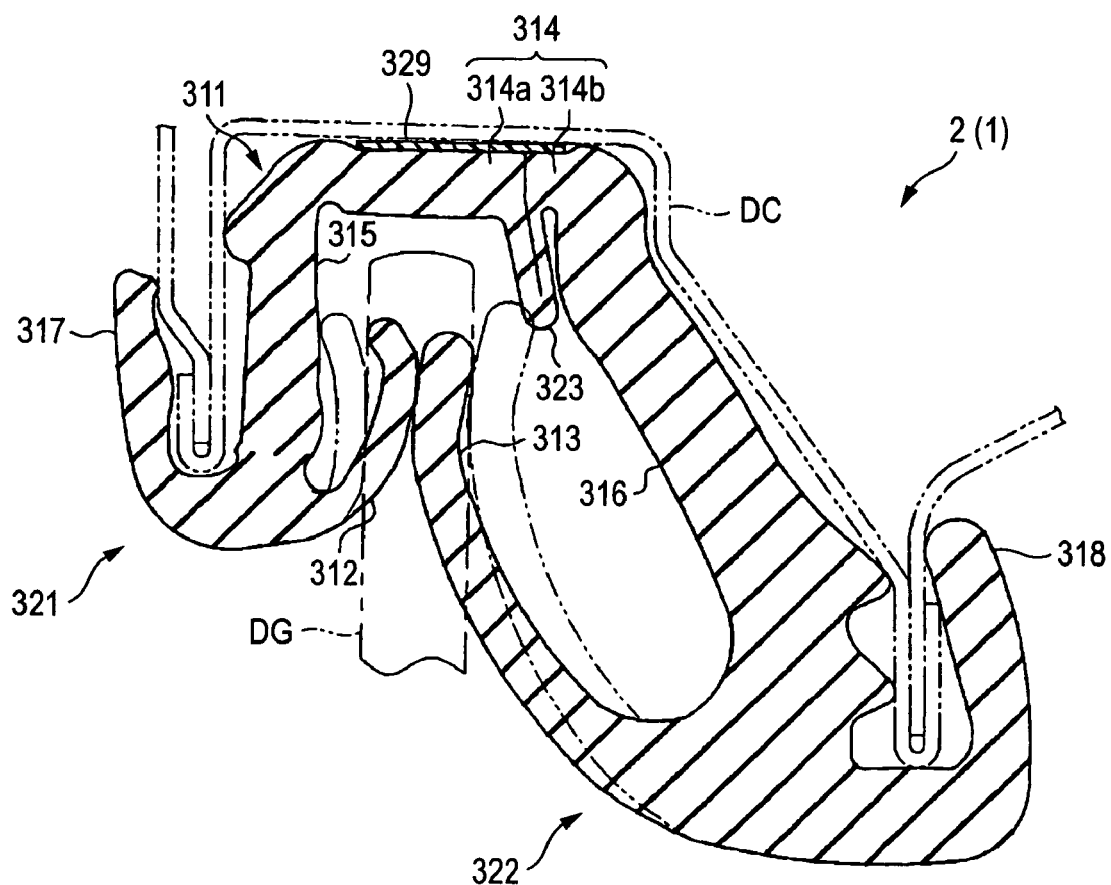
FIG. 23 is a sectional view of a glass run (fourth embodiment) brought into an attached state.
Figure 24:
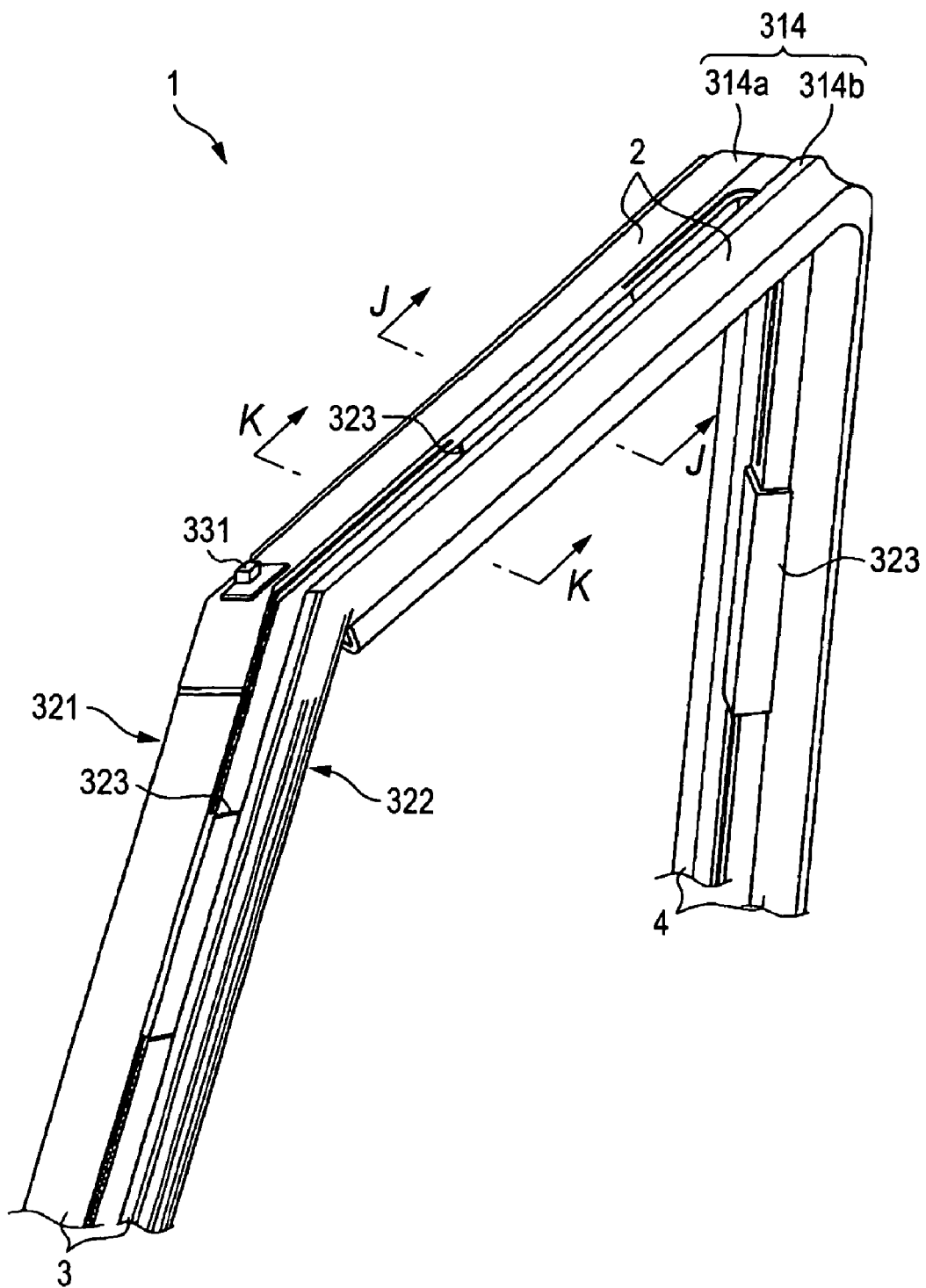
FIG. 24 is a disassembled perspective view of the glass run.
Figure 25A:
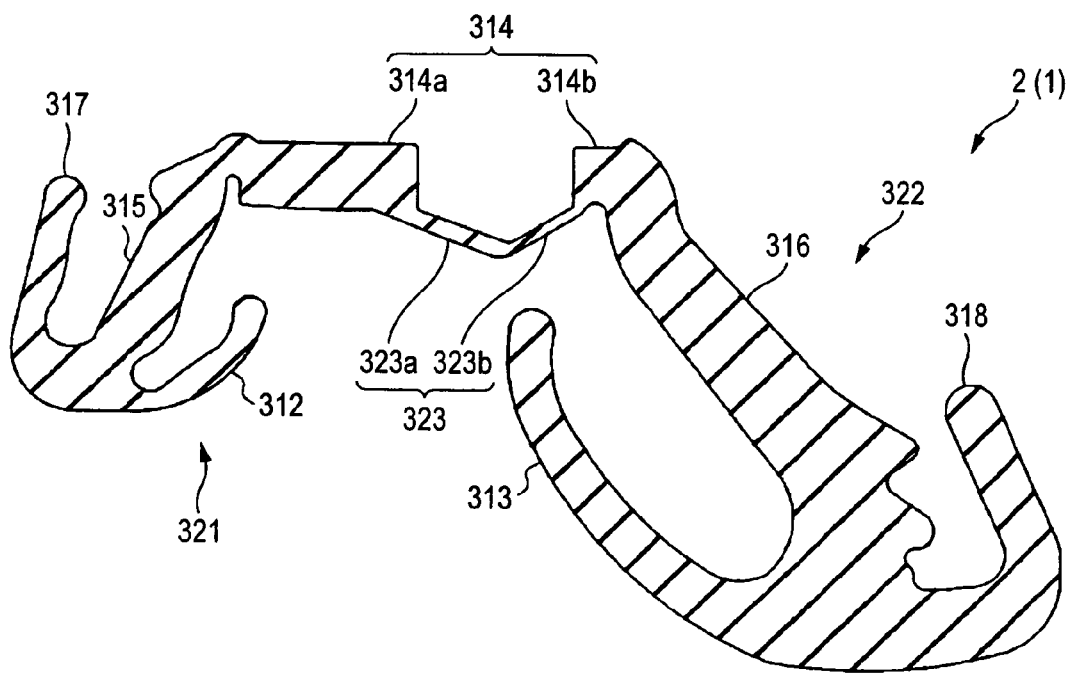
FIG. 25A is a sectional view taken along a line J-J of FIG. 24.

Fourth embodiment will be explained in reference to the drawings as follows. FIG. 23 is a sectional view showing a glass run in a state of being attached to a channel portion. FIG. 24 is a disassembled perspective view showing a glass run brought into a state before being integrated. FIG. 25A is a sectional view taken along a line J-J of FIG. 24 and FIG. 25B is a sectional view taken along a line K-K of FIG. 24.

As shown by FIG. 23, an upper side portion 2 includes a main body portion 311 and a vehicle exterior side seal lip 312 and a vehicle interior side seal lip 313. The main body portion includes a bottom portion 314 fitted to a channel portion DC and a vehicle exterior side wall portion 315 and a vehicle interior side wall portion 316 extended from the bottom portion 314, and constitutes substantially a U-shape as a whole. The vehicle exterior side seal lip 312 is extended substantially from a tip end of the vehicle exterior side wall portion 315 to an inner peripheral side of the main body portion 311 and the vehicle interior side seal lip 313 is extended substantially from a tip end of the vehicle interior side wall portion 316 to the inner peripheral side of the main body portion 311. Further, in a state of closing the door glass DG, the vehicle exterior side seal lip 312 is brought into press contact with an outer side face of the door glass DG and the vehicle interior side seal lip 313 is brought into press contact inner side face of the door glass DG. Thereby, the vehicle exterior side and the vehicle interior side of the door glass DG are respectively sealed. Further, there are provided a vehicle exterior side molding lip 317 extended from the vehicle exterior side wall portion 315 to an outer side (vehicle exterior side), and a vehicle interior side molding lip 318 extended from the vehicle interior side wall portion 316 to an outer side (vehicle interior side).

Further, also with regard to the front vertical side portion 3 and the rear vertical side portion 4, the main body portion 311 and the pair of seal lips 312, 313 and the like are provided. However, the vehicle exterior side molding lip 317 and the vehicle interior side molding lip 318 are omitted at portions of the glass run 1 which are arranged at inside of a door panel 363 downward from a belt line and do not appear in the appearance (in this example, lower portions of the front vertical side portion 3 and the rear vertical side portion 4) to downsize the constitution along with the sash portion DS attached with the portions. Further, the vehicle exterior side seal lip 312 is constituted to be smaller (shorter) than the vehicle interior side seal lip 313. Thereby, the door glass DG is shifted to the vehicle exterior side to achieve flash surface formation.

Figure 25B:
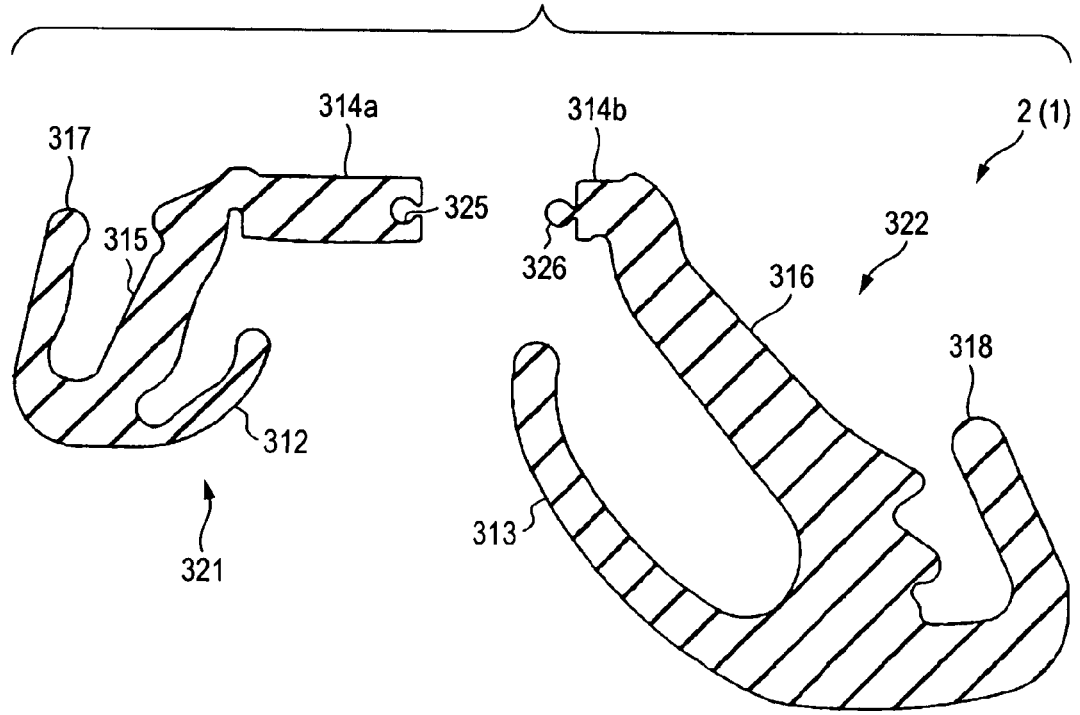
FIG. 25B is a sectional view taken along a line K-K of FIG. 24.

Now, as shown by FIG. 24, FIGS. 25A, 25B and the like, the glass run 1 is divided into a portion on the vehicle exterior side and a portion on the vehicle interior side at the bottom portion 314. A vehicle exterior side molded portion 321 constituting the portion on the vehicle exterior side includes the vehicle exterior side seal lip 312, the vehicle exterior side wall portion 315, and a large portion of the bottom portion 314 (hereinafter, referred to as vehicle exterior side bottom piece 314a). On the other hand, a vehicle interior side molded portion 322 constituting the portion on the vehicle interior side includes the vehicle interior side seal lip 313, the vehicle interior side wall portion 316 and a portion of the bottom portion 314 (hereinafter, referred to as vehicle interior side bottom piece 314b). Further, the vehicle exterior side molded portion 321 and the vehicle interior side molded portion 322 are made to be continuous over an entire region in a longitudinal direction of the glass run 1. Therefore, when the vehicle exterior side molded portion 321 and the vehicle interior side molded portion 322 are integrated, the entire region in the longitudinal direction of the glass run 1 is constituted.

As shown by FIG. 25A, according to the embodiment, there is provided a connecting portion 323 connecting the vehicle exterior side molded portion 321 and the vehicle interior side molded portion 322 at the bottom portion 314 and elongatable and contractable in a vehicle inner and outer direction (vehicle width direction). Further in details, the connecting portion 323 includes a first variable portion 323a extended from a tip end portion of the vehicle exterior side bottom piece 314a and a second variable portion 323b for connecting the tip end portion of the first variable portion 313a and a tip end portion of the vehicle interior side bottom piece 314b and is constituted by a section substantially in a V-shape which is convex to an inner peripheral side of the main body portion 311 as a whole. According to the embodiment, the vehicle exterior side molded portion 321, the vehicle interior side molded portion 322, and the connecting portion 323 are integrally formed by molding by a shape of elongating the connecting portion 323 in the vehicle width direction. Further, as shown by FIG. 23, the glass run 1 is attached to the channel portion DC in a state of contracting the connecting portion 323, such that the connecting portion 323 is formed by a section substantially in an I-shape.

Further, as described above, the vehicle exterior side bottom piece 314a constitutes a large portion of the bottom portion 314, and therefore, the connecting portion 323 is provided at a vicinity of a boundary portion with the vehicle interior side wall portion 316 in the bottom portion 314. Further, the first variable portion 323a is constituted more thick-walled than the second variable portion 323b, and therefore, when the connecting portion 323 is contracted, the second variable portion 323b is predominantly deformed and the connecting portion 323 is shifted to the vehicle interior side as a whole. By the constitution, there can be avoided a situation that in a state of attaching the glass run 1 to the channel portion DC, the connecting portion 323 is brought into contact with the door glass DG to deteriorate a performance of sliding the door glass DG.

Further, as shown by FIG. 24, the connecting portion 323 is not provided over the entire region in the longitudinal direction of the glass run 1 but is provided intermittently. According to the embodiment, the connecting portions 323 are provided at sections of the upper side portion 2, the front vertical side portion 3, and the rear vertical side portion 4 including respective center portions thereof in longitudinal directions and are not provided at respective corner portions of the glass run 1.

As shown by FIG. 25B, at sections of the vehicle exterior side molded portion 321 and the vehicle interior side molded portion 322 which are not provided with the connecting portions 323, the vehicle exterior side molded portion 321 and the vehicle interior side molded portion 322 include engaging portions for engaging to integrate the both members. The engaging portions according to the embodiment are constituted by an engaging recess portion 325 formed at a tip end portion of the vehicle exterior side bottom piece 314a and an engaging projected portion 326 formed at a tip end portion of the vehicle interior side bottom piece 314b. Further, by engaging the engaging projected portion 326 with the engaging recess portion 325, the vehicle exterior side molded portion 321 and the vehicle interior side molded portion 322 are integrated to maintain a state of contracting the connecting portion 323.

Further, the engaging projected portion 326 includes a diameter enlarging portion having a section substantially in a circular shape and the engaging recess portion 325 is constituted by a shape in correspondence therewith, and therefore, by engaging the engaging projected portion 316 with the engaging recess portion 325, a situation that the vehicle exterior side molded portion 321 is detached from the vehicle interior side molded portion 322 in the vehicle width direction is made to be difficult to be brought about. Further, the engaging portions are provided intermittently in the longitudinal direction of the glass run 1, and therefore, a situation that the vehicle exterior side molded portion 321 and the vehicle interior side molded portion 322 are shifted from each other in the longitudinal direction can be prevented.

Further, as shown by FIG. 23, an outer side face of the bottom portion 314 is pasted with a connecting tape 329 to ride over the vehicle exterior side bottom piece 314a and the vehicle interior side bottom piece 314b. Thereby, there can be prevented a situation that the vehicle exterior side bottom piece 314a and the vehicle interior side bottom piece 314b are separated at a portion at which the engaging recess portion 325 and the engaging projected portion 326 are not provided and the integrated state can be stabilized.

In addition thereto, an end portion on a side of the front vertical side portion 3 of a portion of the vehicle exterior side molded portion 321 in correspondence with the upper side portion 2 is integrally provided with a projected portion 331 projected from the vehicle exterior side bottom piece 314a to a side of a direction of being attached to the channel portion DC (upper side). Further, similar to the first embodiment shown in FIG. 1, the projected portion 331 is locked by the channel portion DC in a state of being fitted to an insertion hole 322 formed at the channel portion DC in a state of being attached to the channel portion DC of the glass run 1. Thereby, when the door glass DG is closed (when the door glass DG is brought into contact with the bottom portion 314 of the upper side portion 2, a situation that the glass run 1 is shifted to move to a rear side can be prevented.

Figure 26:
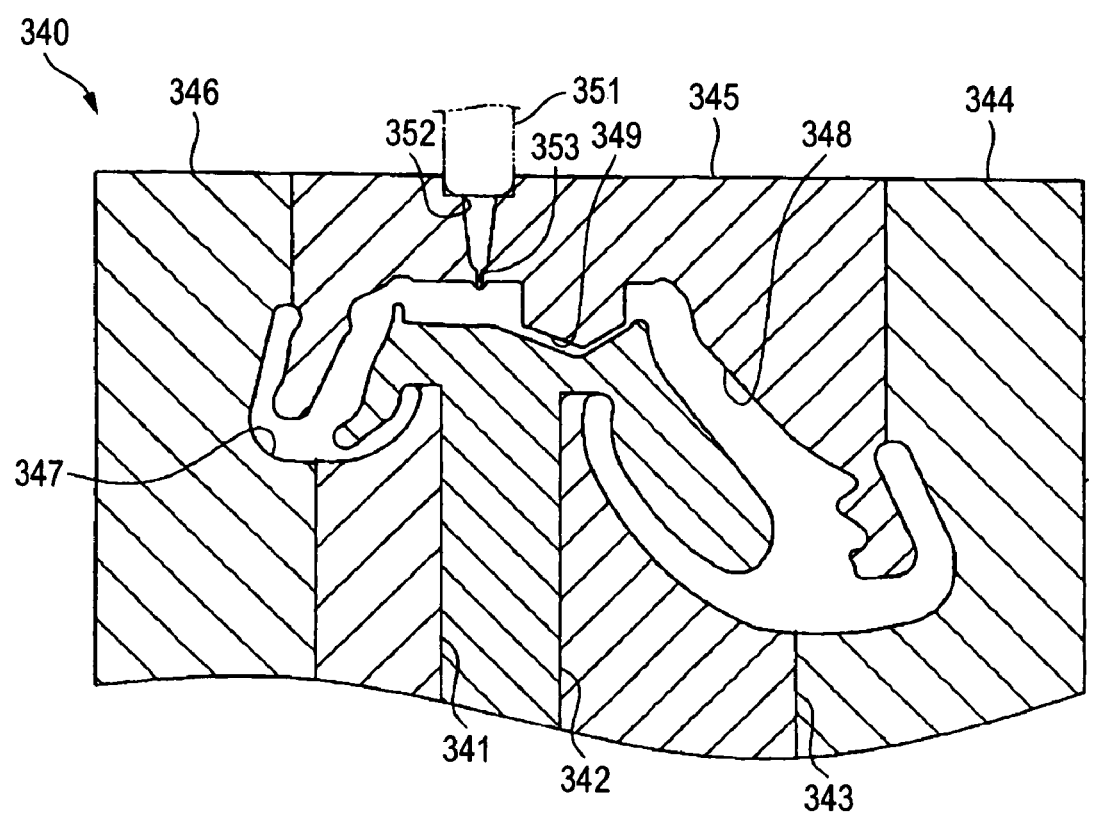
FIG. 26 is a sectional view of a molding apparatus.

Next, a molding apparatus 340 for molding the vehicle exterior side molded portion 321, the vehicle interior side molded portion 322, and the connecting portion 323 will be explained in reference to FIG. 26. FIG. 26 is a sectional view showing the molding apparatus 340 used for molding the vehicle exterior side molded portion 321, the vehicle interior side molded portion 322, and the connecting portion 323.

As shown by the drawing, the molding apparatus 340 includes a first mold 341, a second mold 342, a third mold 343, a fourth mold 344, a fifth mold 345, a sixth mold 346.

The first mold 341, the second mold 342, the fifth mold 345, and the sixth mold 346 are formed with mold faces in correspondence with an outer shape of the vehicle exterior side molded portion 321, and a vehicle exterior side cavity 347 for molding the vehicle exterior side molded portion 321 is formed by the mold faces. Further, the second side 342, the third mold 343, the fourth mold 344, and the fifth mold 345 are formed with mold faces in correspondence with an outer shape of the vehicle interior side molded portion 322, and a vehicle interior side cavity 348 for molding the vehicle interior side molded portion 322 is formed by the mold faces. Further, the second mold 342 and the fifth mold 345 are formed with mold faces in correspondence with an outer shape of the connecting portion 323 in an elongated state, and the vehicle exterior side cavity 347 and the vehicle interior side cavity 348 are communicated and a communicating path 349 for forming the connecting portion 323 is formed by the mold faces.

Further, the fifth mold 345 is formed with a sprue 352 and a gate 353 for injecting unvulcanized EPDM injected from injecting means 351. Further, the communicating paths 349 are formed at three portions in order to respectively form the connecting portions 323 at the upper side portion 2, the front vertical side portion 3, and the rear vertical side portion 4. Further, according to the embodiment, singles of the injecting means 351, the sprues 352, and the gates 353 are provided in correspondence with the respective communicating paths 349.

Next, a method of fabricating the glass run 1 will be explained. First, the vehicle exterior side molded portion 321, the vehicle interior side molded portion 322, and the connecting portion 323 are molded by using the molding apparatus 340. That is, after fastening the molds, the unvulcanized EPDM is filled to the vehicle exterior side cavity 347, the vehicle interior side cavity 348, and the connecting path 349 by way of the sprue 352 and the gate 353 by the injecting means 351. According to the embodiment, although only the gate 353 communicating with the vehicle exterior side cavity 348 is formed, and EPDM is injected only to the side of the vehicle exterior side cavity 348, since the communicating path 349 for communicating the vehicle exterior side cavity 347 and the vehicle interior side cavity 348 is formed, EPDM is injected also to the vehicle interior side cavity 348 by passing the connecting path 349.

Thereafter, EPDM is vulcanized to solidify, the molds are opened after having been solidified, the vehicle exterior side molded portion 321, the vehicle interior side molded portion 322, and the connecting portion 323 integrally molded with the connecting portion 323 in a shape of being elongated in a vehicle inner and outer direction are detached from the molding apparatus 340.

Successively, the vehicle exterior side molded portion 321 and the vehicle inner molded portion 322 are integrated. That is, the engaging projected portion 326 is engaged with the engaging recess portion 325 by bringing the connecting portion 323 into a contracted state. Thereby, there is constituted an entire region in the longitudinal direction of the glass run 1 constituting a sectional shape having the main body portion 311 and the seal lips 312, 313 and the like and including the upper side portion 2, the front vertical side portion 3, and the rear vertical side portion 4 as described above. Thereafter, the glass run 1 is fabricated by pasting the connecting tape 329 to the outer side face of the bottom portion 321.

As described above in details, according to the embodiment, there is constituted the entire region in the longitudinal direction of the glass run 1 comprising the upper side portion 2, the front vertical side portion 3, and the rear vertical side portion 4 by integrating the vehicle exterior side molded portion 321 and the vehicle interior side molded portion 322. That is, the glass run 1 can be constituted only by the molded member. Therefore, there can be avoided a situation in which a line of connecting an extruded member and a molded member appears at an appearance as in a case of constituting the glass run 1 by connecting the extruded member and the molded member in the longitudinal direction. Further, a situation of bringing about a difference in color/glaze partially in a longitudinal direction (peripheral direction of the glass run 1) can be avoided. As a result, an appearance quality is promoted. Further, a concern that a stepped difference is formed in the longitudinal direction of the glass run 1 can be avoided and the sealing performance is promoted.

Further, the vehicle exterior side molded portion 321 and the vehicle interior side molded portion 322 are subjected to molding by a shape of being connected by the connecting portion 323, and therefore, it is not necessary to respectively subject the vehicle exterior side molded portion 321 and the vehicle interior side molded portion 322 to molding, and an equipment can be simplified and a fabrication operability can be promoted. Further in details, the connecting path 349 for connecting the vehicle exterior side cavity 347 and the vehicle interior side cavity 348 is provided, and therefore, by injecting EPDM to a side of one cavity (for example, vehicle exterior side cavity 347), EPDM can be injected to other cavity (for example, vehicle interior side cavity 348) by way of the connecting path 349. That is, it is not necessary to provide a mechanism for injecting EPDM (injecting means 351, sprue 352, and gate 353) in correspondence with the side of the vehicle interior side cavity 348 and cost can be restrained. Further, all of the mold portions constituting the glass run 1 can be taken out by opening the molds of the single molding apparatus 340, it is not necessary to respectively prepare the vehicle exterior side molded portion 321 and the vehicle interior side molded portion 322 in integrating the both mold portions 321, 322 since an integrated object is constituted by the vehicle exterior side molded portion 321 and the vehicle interior side molded portion 322, and positioning to some degree is carried out in the longitudinal direction by presence of the connecting portion 323 and the like, thereby, a productivity can be promoted.

Further, the connecting portion 323 is made to be elongatable and contractable in the vehicle inner and outer direction (vehicle width direction), according to the embodiment, the connecting portion 323 is subjected to molding by a shape elongated in the vehicle width direction. Therefore, the both seal lips 312, 313 can sufficiently be separated from each other, and therefore, it is not necessary to constitute a developed shape of considerably widening tip ends of the vehicle exterior side wall portion 315 and the vehicle interior side wall portion 316. Therefore, it is not necessary to considerably deform the sectional shape when attached to the channel portion DC, and therefore, a state of attaching the glass run 1 to the channel portion DC can be stabilized and the sealing performance can be promoted.

Further, the both molded portions 321, 322 can be integrated to be proximate to each other in the vehicle width direction by bringing the connecting portion 323 into a state of being contracted in the vehicle width direction. That is, a situation that the glass run 1 cannot be attached to the channel portion DC unless the connecting portion 323 is cut off can be avoided. Therefore, an attaching operability can be prevented from being deteriorated.

In addition thereto, the connecting portions 323 are intermittently provided in the longitudinal directions of the vehicle exterior side molded portion 321 and the vehicle interior side molded portion 322. Therefore, in comparison with a case of providing the connecting portion 323 at the entire region in the longitudinal direction of the glass run 1, a repulsive force of the total of the connecting portion 323 can be restrained and the connecting portion 323 can comparatively easily be brought into a contracted state. Particularly, the connecting portion 323 is omitted at the corner portion, and therefore, when the connecting portion 323 is brought into the contracted state, a situation that the connecting portion 323 of the upper side portion 2 and the connecting portion 323 of the front and rear vertical side portions, 3, 4 are influenced by each other to be difficult to be deformed can be avoided.

Further, as described above, an entire region in the longitudinal direction of the glass run 1 comprises the molded member, and therefore, even when the sectional shape is made to differ partially, the glass run 1 can easily be molded. Therefore, a situation that an operation is separately needed in order to make the sectional shape differ partially can be avoided and the productivity is promoted.

Further, by providing the engaging portions (engaging recess portion 25 and engaging projected portion 26), the vehicle exterior side molded portion 321 and the vehicle interior side molded portion 322 can be positioned, and an operability of attaching to the channel portion DC can be promoted and a state of attaching to the channel portion DC can be stabilized. Further, in comparison with the case of connecting, for example, the molded portions 321, 322 only by an adhesive, it is not necessary that a time period is required until drying the adhesive, or it is necessary to maintain a state of bringing faces of the molded portions 321, 322 coated with the adhesive into press contact with each other, and therefore, the fabrication operability can be restrained from being deteriorated.

Further, the engaging portions are provided at a section at which the connecting portion 323 is not provided in the longitudinal directions of the respective molded portions 321, 322. Therefore, in comparison with the case of providing the engaging portions also in the section of providing the connecting portion 323, for example, the sectional shape can be restrained from being complicated, as a result, the mold structure can be simplified. Further, portions of engaging the engaging projected portion 326 with the engaging recess portion 325 are reduced, and therefore, an integration operability can be promoted.

(a) Positions of arranging the connecting portions 323 and a number thereof in the above-described embodiment are not particularly limited but, for example, the connecting portion 323 may be provided only at the upper side portion 2 or may be provided in correspondence with the both corner portions. Further, for example, the connecting portion 323 may be provided over the entire region in the longitudinal direction of the glass run 1.

Further, positions of arranging the injecting means 351, the sprue 352, and the gate 353 and a number thereof are not particularly limited. Further, according to the constitution of the embodiment, by the presence of the connecting path 349, when EPDM is injected to any of the vehicle exterior side cavity 347, the vehicle interior side cavity 348, and the connecting path 349, EPDM can be filled to all of the vehicle exterior side cavity 347, the vehicle interior side cavity 348, and the connecting portion 349, and therefore, at least singles of the injecting means 351, the sprue 352, and the gate 353 may be provided. Naturally, by constituting these by singles, the constitution can considerably be simplified.

(b) Although according to the above-described embodiment, the engaging portions (engaging projected portion 326 and engaging recess portion 325) is provided to the section at which the connecting portion 323 is not provided, the engaging portions may be provided also at a section at which the connecting portion 323 is provided, and the engaging portions may not necessarily be provided at the section at which the connecting portion 323 is not provided. For example, the engaging portions may be provided over the entire region in the longitudinal direction of the glass run 1.

Further, although according to the above-described embodiment, by engaging the engaging projected portion 326 with the engaging recess portion 325, the vehicle exterior side molded portion 321 and the vehicle interior side molded portion 322 are integrated to maintain a state of contracting the connecting portion 323, the invention is not particularly limited to such a constitution.

Figure 27:
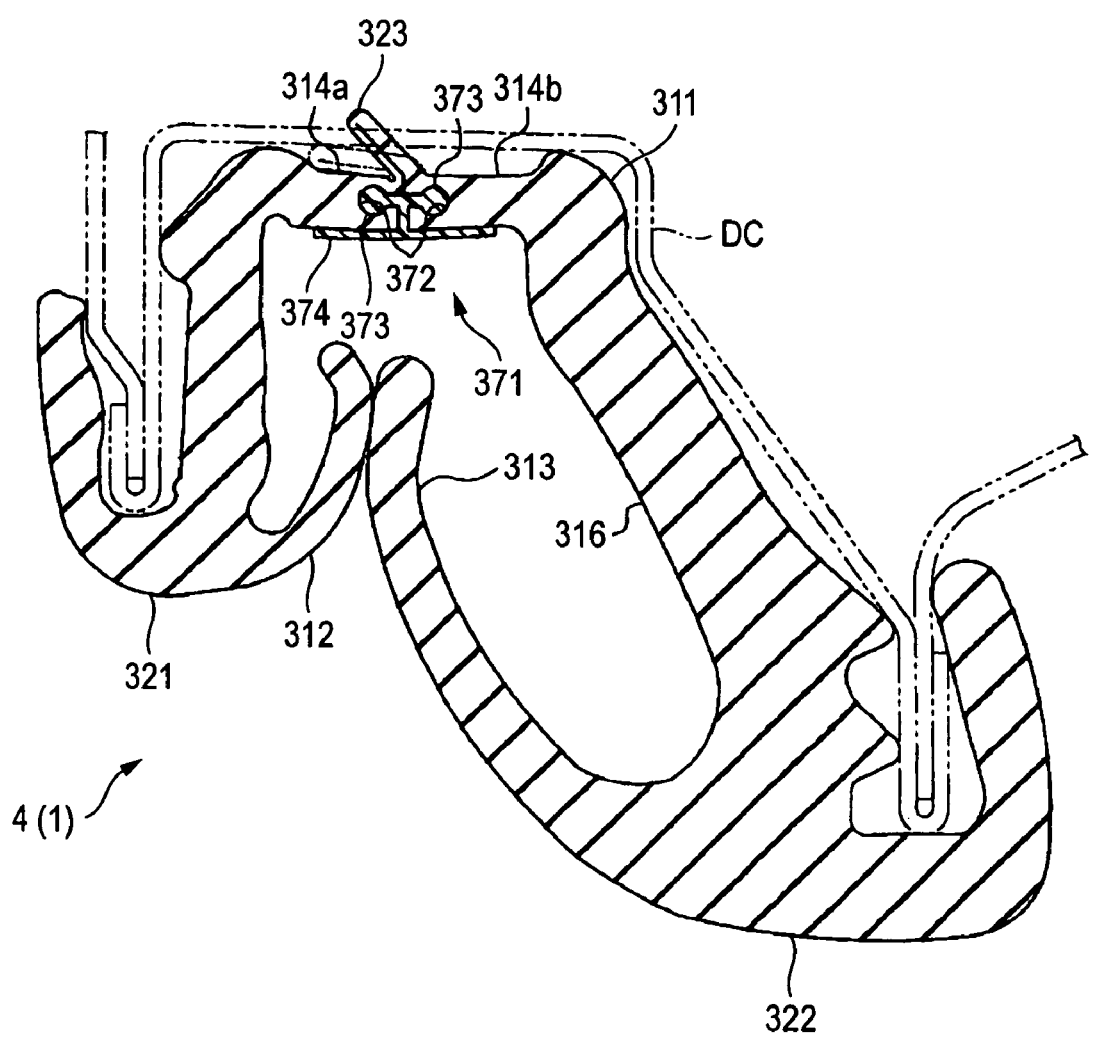
FIG. 27 is a sectional view of a glass run in other example.

For example, as shown by FIG. 27, the vehicle exterior side molded portion 321 and the vehicle interior side molded portion 322 may be integrated by a connecting member 371 constituted separately from the both molded portions 321, 322. As shown by the drawing, the connecting member 371 may include engaging projected portions 373 engaged with engaging recess portion 372 formed at respective tip end portions of the vehicle exterior side bottom piece 314a and the vehicle interior side bottom piece 314b. Further, the connecting member 371 may include a functioning portion 374 constituting an inner side portion (inner side face) of the bottom portion 314. By providing the functioning portion 374 in this way, the inner side face of the bottom portion 314 can be constituted by a material different from that of the molded portions 321, 322, for example, when the functioning portion 374 is constituted by a material harder than that of the molded portions 321, 322, a performance of sliding the door glass DG can be promoted. Further, for example, even when it is intended to adopt a shape by which the vehicle exterior side molded portion 321, the vehicle interior side molded portion 322, and the connecting portion 323 are difficult to be subjected to molding simultaneously (for example, hollow shape) to the inner side portion of the bottom portion 314, the shape can be formed without complicating the molding apparatus.

Further, the engaging portions can also be omitted. Further, the vehicle exterior side molded portion 321 and the vehicle interior side molded portion 322 may be integrated by being subjected to thermal welding when an adhesive or a tape member is used or the connecting portion 323 is constituted by a resin, for example, in place of or in addition to the engaging portions.

(c) A sectional shape of the connecting portion 323 in the above-described embodiment is not particularly limited but may be constituted elongatably and contractively in the vehicle width direction by connecting the vehicle exterior side molded portion 321 and the vehicle interior side molded portion 322 at the bottom portion 314.

For example, as shown by FIG. 27, the connecting portion 323 may be constituted to be concave to an outer peripheral side of the main body portion 311. Further, from a view point of stabilizing a state of being attached to the sash portion DC, it is preferable that the connecting portion 323 is not projected to an outer peripheral side of the main body portion 311 from an outer side face of the bottom portion 314. However, even when the connecting portion 323 is projected to the outer peripheral side of the main body portion 311 from the outer side face of the bottom portion 314, in a case in which the connecting portion 323 is constituted by a shape of being easy to be inclined to fall down as shown by FIG. 27, or a shape easy to be deformed by being crushed, a situation that the glass run 1 is floated up from the channel portion DC by being caused by the repulsive force of the connecting portion 323 can be restrained.

Figure 28:
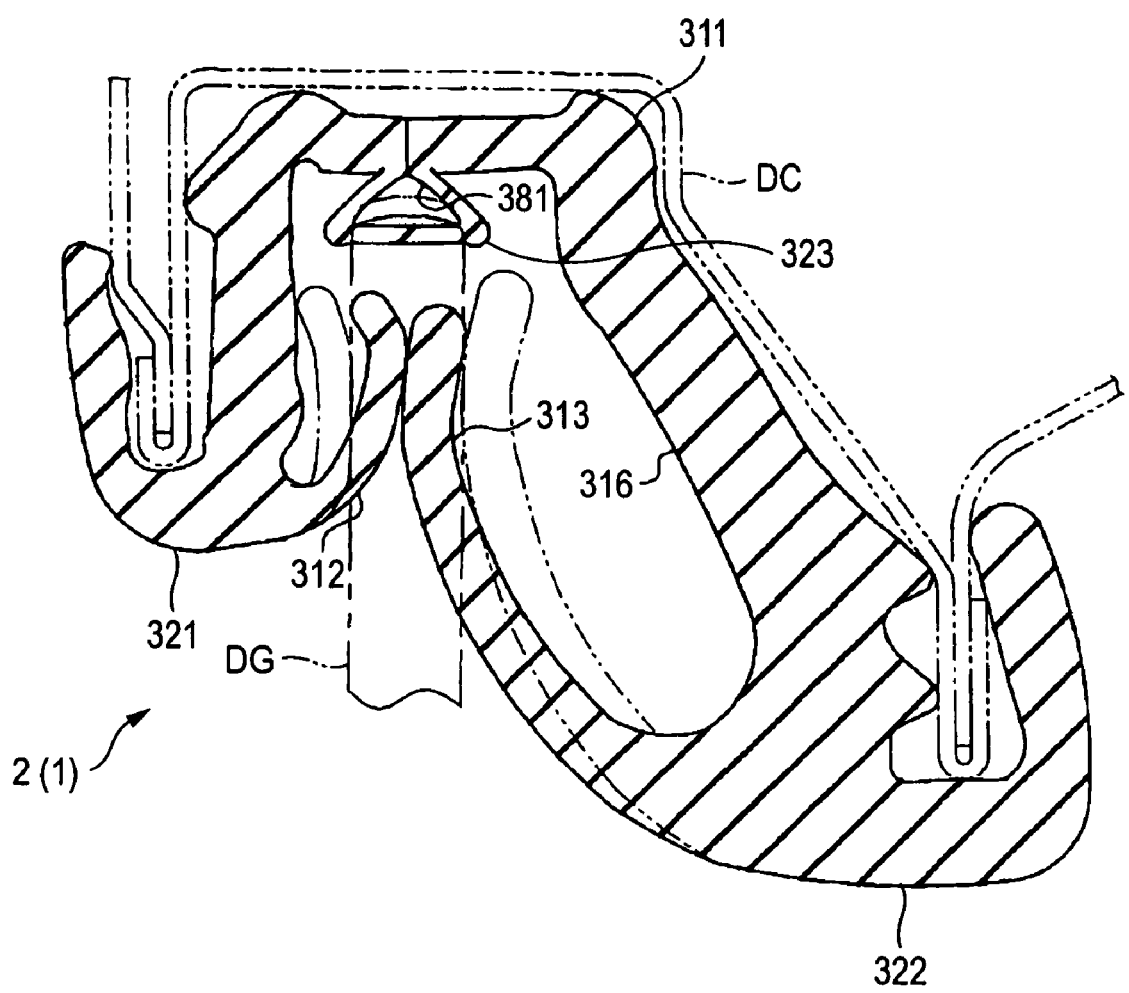
FIG. 28 is a sectional view of a glass run in other example.

Further, for example, as shown by FIG. 28, with regard to the connecting portion 323 provided in correspondence with the upper side portion 2, the connecting portion 323 can be constituted to form a hollow portion 381 at a position in correspondence with an upper edge portion of the door glass DG. In this case, an impact by butting by the door glass DG can be absorbed at the hollow portion 381. As a result, impact sound in closing the door glass DG can be restrained.

Figure 29:
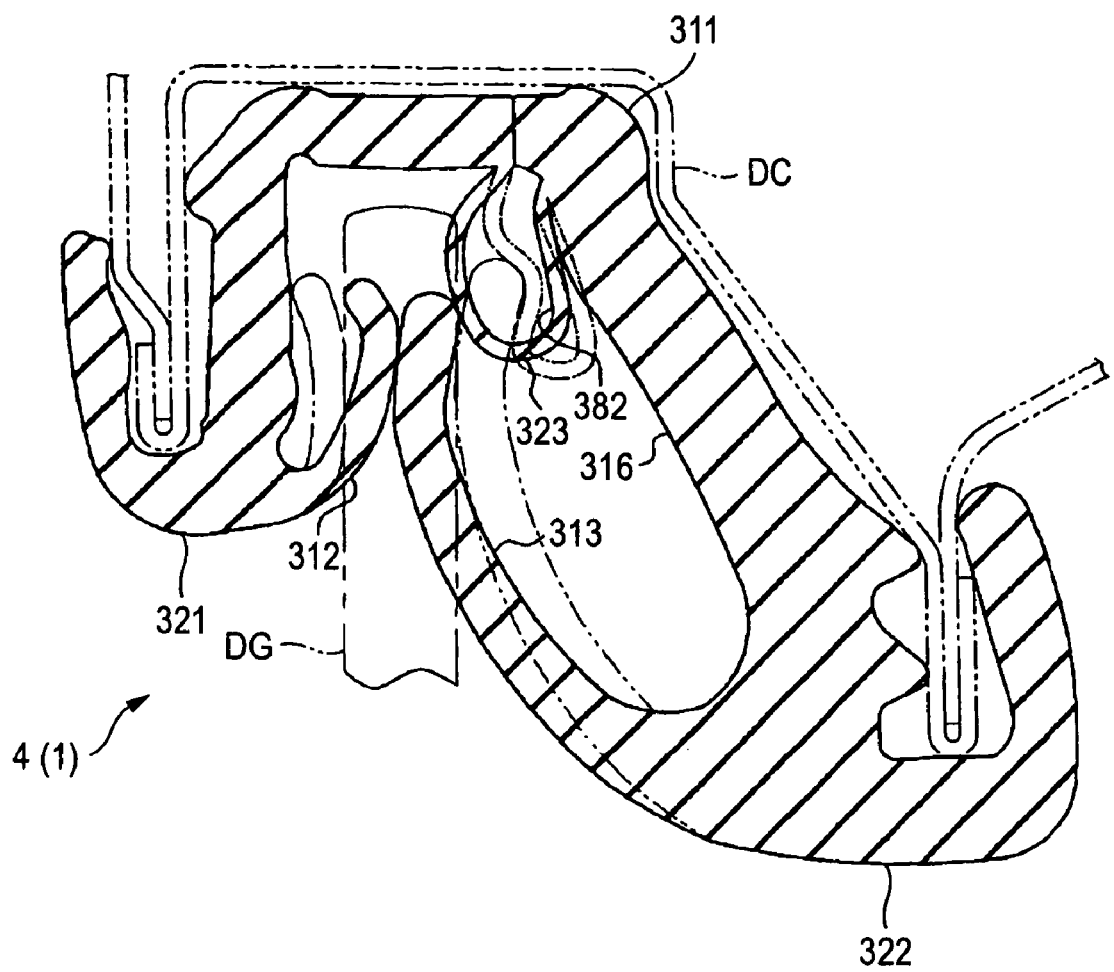
FIG. 29 is a sectional view of a glass run in other example.

Further, for example, as shown by FIG. 29, with regard to the connecting portion 323 provided in correspondence with the rear vertical side wall portion 4 (front vertical side portion 3), the connecting portion 323 may be constituted to form a hollow portion 382 at a position capable of being brought into contact with a face on a side opposed to a door glass sliding face of the vehicle inner seal lip 313. In this case, when the door glass DG is going to be displaced to the vehicle interior side, the door glass DG is supported to press back cooperatively while bending both of the vehicle interior side seal lip 313 and the connecting portion 323 having the hollow portion 382. Therefore, rattle of the door glass DG can be restrained. Further, the vehicle interior side seal lip 313 is brought into a state of being pinched by the connecting portion 323 and the door glass DG, and therefore, a situation that the vehicle interior side seal lip 313 is vibrated in the vehicle width direction and the vehicle interior side seal lip 313 is separated from the door glass DG can be prevented. Therefore, the sealing performance can be promoted and a sound blocking performance can be promoted.

Fifth Embodiment

Figure 30:
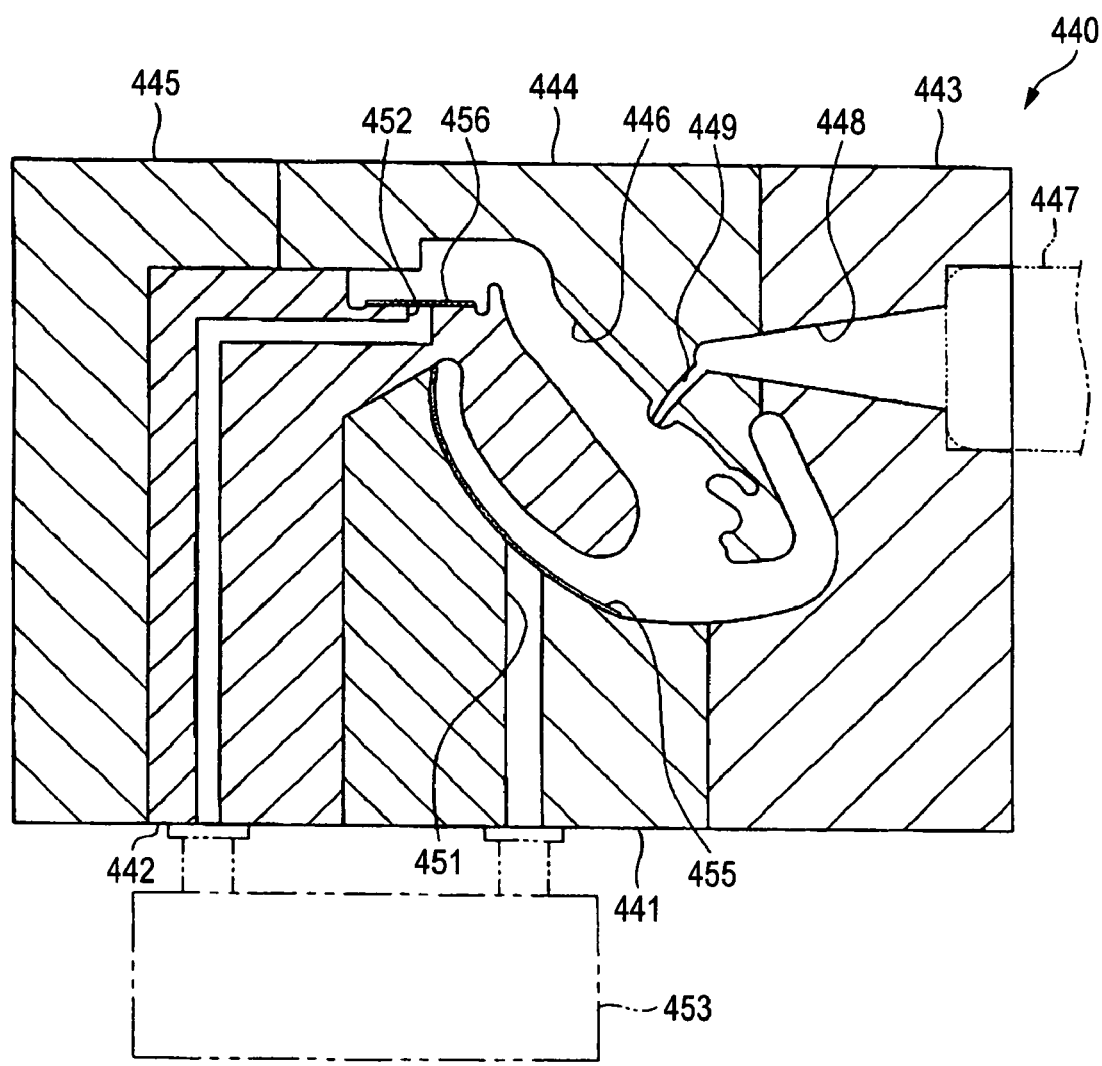
FIG. 30 is a sectional view showing a molding apparatus for molding a vehicle interior side molded member.

Next, an explanation will be given of a molding apparatus 440 for molding a vehicle interior side molded member 422 as an example of a mold for molding a molded member in reference to FIG. 30. FIG. 30 is a sectional view showing the molding apparatus 440 used for molding the vehicle interior side molded member 422.

As shown by the drawing, the molding apparatus 440 includes a first mold 441, a second mold 442, a third mold 443, a fourth mold 444, a fifth mold 445. The first mold 441, the second mold 442, the third mold 443, the fourth mold 444 are respectively formed with mold faces in correspondence with an outer shape of the vehicle interior side molded member 422, and a cavity 446 for molding the vehicle interior side molded member 422 is formed by the mold faces. Further, the third mold 443 and the fourth mold 444 are formed with a sprue 448 and a gate 449 for injecting TPV in a plasticized state injected from injecting means 447 into the cavity 446.

Further, the mold face for molding a door glass sliding face of the vehicle inner seal lip 413 in the first mold 441 is formed with a first suction hole 451, the mold face for molding an inner side face of the bottom portion 414 in the second mold 442 is formed with a second suction hole 452. According to the embodiment, sucking means 453 provided along with the molding apparatus 440 is constituted to be able to suck air at inside of the cavity 446 by way of the sucking holes 451, 452. Further, although with regard to also the vehicle exterior side molded member 421, in subjecting the vehicle exterior side molded member 421 to molding, a molding apparatus in correspondence therewith is used, illustration and explanation thereof are omitted.

Next, a method of fabricating the glass run 1 constituted by including the above-described constitution will be explained. First, the vehicle exterior side molded member 421 and the vehicle interior side molded member 422 are respectively subjected to molding.

Here, the molding of the vehicle interior side molded member 422 will be explained in reference to FIG. 30. Further, FIG. 30 shows a section of the molding apparatus 440 brought into a state of fastening the molds after setting EP sheets 455, 456 for constituting sliding layers 428, 429 at inside of the cavity 446.

First, in a state of opening the molds of the molding apparatus 440, the PE sheet 455 is set to a mold face of molding a door glass sliding face of the vehicle interior side seal lip 413 in the first mold 441 and the PE sheet 456 is set to a mold face of molding an inner side face of the bottom portion 414 in the second mold 412. At this occasion, the PE sheets 455, 456 are sucked by the sucking means 453 by way of the sucking holes 451, 452, the PE sheets 455, 456 are brought into a state of being brought into close contact with the corresponding respective mold faces, a positional shift thereof is restricted. Further, according to the embodiment, there is constructed a constitution in which when the PE sheets 455, 456 are set to the mold faces, the positional shift of the PE sheets 455, 456 are restricted, and therefore, an installing step and a shift preventing step are carried out substantially simultaneously.

Further, the molds are fastened while staying in the state of sucking the PE sheets 455, 456 by the sucking means 453, TPV brought into the plasticized state is injected to be filled at inside of the cavity 446 of the molding apparatus 440. After having finished to solidify, the molds are opened, and the molded vehicle interior side molded member 422 is detached from the molding apparatus 440. Thereby, the vehicle interior side molded member 422 formed with the vehicle interior side sliding member 428 and the base portion side sliding layer 429 is provided. Further, also with regard to the vehicle exterior side molded member 421, by using a corresponding molding apparatus, the vehicle exterior side molded member 421 is fabricated by being processed by steps similar to those of the vehicle interior side molded member 422. That is, the vehicle exterior side sliding layer 427 is simultaneously formed in being subjected to molding.

Successively, the vehicle exterior side molded member 421 and the vehicle interior side molded member 422 subjected to molding as described above are integrated. That is, according to the embodiment, an engaging projected portion 426 is engaged with an engaging recess portion 425. Thereby, there is constituted an entire region in the longitudinal direction of the glass run 1 constituting a sectional shape including the main body portion 11 and the seal lips 412, 413 and the like as described above and including the upper side portion 2, the front vertical side portion 3, and the rear vertical side portion 4.

As described above in details, according to the embodiment, by integrating the vehicle exterior side molded member 421 and the vehicle interior side molded member 422, the entire region in the longitudinal direction of the glass run 1 comprising the upper side portion 2, the front vertical side portion 3, and the rear vertical side portion 4 is constituted. That is, the glass run 1 can be constituted by only a molded member. Therefore, for example, there can be avoided a situation in which a line of connecting an extruded member and a molded member appears in an appearance as in a case in which the glass run 1 is constituted by connecting the extruded member and the molded member in the longitudinal direction. Further, there can avoided a situation that a difference is brought about in color/glaze partially in the longitudinal direction (peripheral direction) of the glass run 1. As a result, an appearance quality is promoted. Further, a concern that a stepped difference is formed in the longitudinal direction of the glass run 1 can be avoided and a sealing performance is promoted.

Further, since the vehicle exterior side seal lip 412 is provided at the vehicle exterior side molded member 421, the vehicle interior side seal lip 413 is provided at the vehicle interior side molded member 422, it is not necessary to mold the glass run 1 by a developed shape of considerably widening the vehicle exterior side wall portion 415 and the vehicle interior side wall portion 416 and the glass run 1 can be constituted by a shape by which the sectional shape needs not to be deformed considerably in being attached to the channel portion DC (sash portion DS). Therefore, the state of attaching the glass run 1 to the channel portion DC can be stabilized and the sealing performance can be promoted.

Further, according to the embodiment, when the vehicle exterior side molded member 421 and the vehicle interior side molded member 422 are subjected to molding, the sliding layers 427, 428, 429 are simultaneously formed. That is, by subjecting the PE sheets to insert molding in molding by the molds, the molded members 421, 422 formed with the sliding layers 427, 428, 429 can be provided. Therefore, there can be omitted an operation of pasting the tape member to the door glass sliding faces of the vehicle exterior side seal lip 412 and the vehicle interior side seal lip 413 and an inner side face of the bottom portion 414 or coating a sliding agent after molding and fabrication operability can be promoted.

In addition thereto, TPV constituting the glass run 1 (vehicle exterior side molded member 421 and the vehicle interior side molded member 422) and the PE sheets constituting the sliding layers 427, 428, 429 are provided with a compatibility, and therefore, the both members can solidly be bonded without separately using an adhesive or the like.

Further, in subjecting the vehicle interior side molded member 422 to molding, in order to form the sliding layers 428, 429, the PE sheets 455, 456 are set to inside of the cavity 446, according to the embodiment, the PE sheets 455, 456 set to inside of the cavity 446 are sucked by the sucking means 453 by way of the suction holes 451, 452. Thereby, the PE sheets 455, 456 are brought into a state of being brought into close contact with the corresponding respective mold faces and the positional shift of the PE sheets 455, 456 is restrained. Further, under the state, TPV brought into the plasticized state is injected into the cavity 446. Therefore, when TPV is injected to be filled at inside of the cavity 446, there can be prevented a concern that the PE sheets 455, 456 are positionally shifted from each other, TPV invades intervals between the PE sheets 455, 456 and the mold faces in correspondence therewith and the PE sheets 455, 456 are not exposed to the surface of the vehicle interior side molded member 422. Therefore, the PE sheets 455, 456 can be exposed firmly to the surface at predetermined positions, and the sliding layers 428, 429 can further precisely be formed. Naturally, also the vehicle exterior side molded member 421 is fabricated by being processed by steps similar to those of the vehicle interior side molded member 422 to achieve similar operation and effect.

Further, for example, when the PE sheets are pasted after molding in order to form the sliding layers at the door glass sliding faces of the vehicle exterior side seal lip 412 and the vehicle interior side seal lip 413 formed to be bent, there is a concern that such an operation becomes comparatively difficult and there is a concern of deteriorating the operability or deteriorating the quality. In this respect, according to the embodiment, the drawback can be wiped out since the sliding layers 427, 428 can be formed at the door glass sliding faces of the vehicle exterior side seal lip 412 and the vehicle interior side seal lip 413 simultaneously in molding and at precise positions.

In addition thereto, the base portion side sliding layer 429 provided in correspondence with the inner side face of the bottom portion 414 is formed only at the vehicle interior side molded member 422 (vehicle interior side bottom piece 414b). In contrast thereto, for example, when the base portion side sliding layer 429 is formed not only at the vehicle interior side molded member 412 but also the vehicle exterior side molded member 421, it is necessary to carry out an operation of forming the respective base portion side sliding layer 429 in subjecting the molded members 421, 422 to molding (operation of installing PE sheet or the like). Further, it is necessary to form a mechanism for preventing the positional shift of the PE sheet installed for forming the base side sliding layer 429 (providing suction hole or the like) not only at the molding apparatus 440 for molding the vehicle interior side molded member 422 but also at a molding apparatus for molding the vehicle exterior side molded member 421. In this respect, according to the embodiment, an operation for forming the base side sliding layer 429 is carried out by one time (a total of the base portion side sliding layer 429 is simultaneously formed by subjecting the vehicle interior side molded member 422 to molding) and therefore, the above-described drawback can be prevented.

Further, according to the embodiment, the engaging projected portion 426 and the engaging recess portion 425 are provided, and the vehicle exterior side molded member 421 and the vehicle interior side molded member 422 are directly integrated. Therefore, for example, in comparison with a case of connecting the molded members 421, 422 by an adhesive, it is not necessary that a time period is required until drying the adhesive, or it is necessary to hold faces of the molded members 421, 422 coated with the adhesive in a state of being brought into press contact with each other, and therefore, the fabrication operability can be restrained from being deteriorated.

Further, the invention is not limited to a described content of the above-described embodiment but may be embodied as, for example, follows. Naturally, other application examples, change examples which are not exemplified in the following can naturally be embodied.

(a) Although in the above-described embodiment, the sucking means 453 is used for bringing the PE sheets 455, 456 (sliding members) into close contact with the mold faces and maintaining the close contact state, the invention is not limited to such a constitution but there may be constructed a constitution in which when TPV is injected to be filled at inside of the cavity 446, the sliding member is not positionally shifted. For example, the positional shift of the sliding member may be prevented by using static electricity. In this case, a holding force can be exerted uniformly to a total face of the sliding member, and therefore, a concern that the sliding member is partially floated up from the mold face can be prevented.

Figure 31:
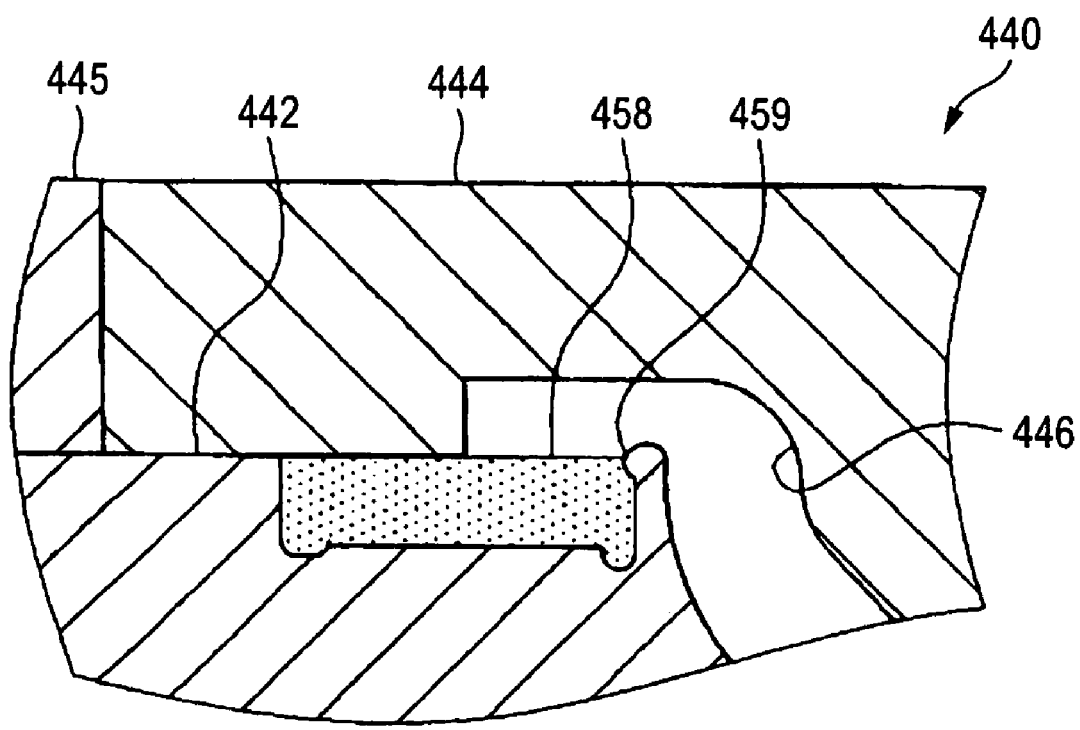
FIG. 31 is a sectional view showing a molding apparatus in other example.

Further, as shown by FIG. 31, there may be provided a restricting portion 459 for locking an end, portion of the sliding member 458 relative to a portion of the mold (for example, second mold 442). In this case, the sliding member 458 can be restricted from being moved to shift to a side of a general portion by the restricting portion 459 without providing the sucking means or the like, as a result, the positional shift of the sliding member can be prevented while restraining an increase in cost. Further, the restricting portion 459 can also be combined to the constitution of sucking the sliding member in the above-described embodiment and in this case, the sliding member can further firmly be prevented from being moved to shift at an end portion thereof (end portion is floated up from the molding face).

Further, although according to the above-described embodiment, the glass run 1 of a front door has been explained particularly in details, also in a glass run of a rear door, similarly, in subjecting the molded members 421, 422 to molding, the sliding layer may simultaneously be formed.

Figure 32A:
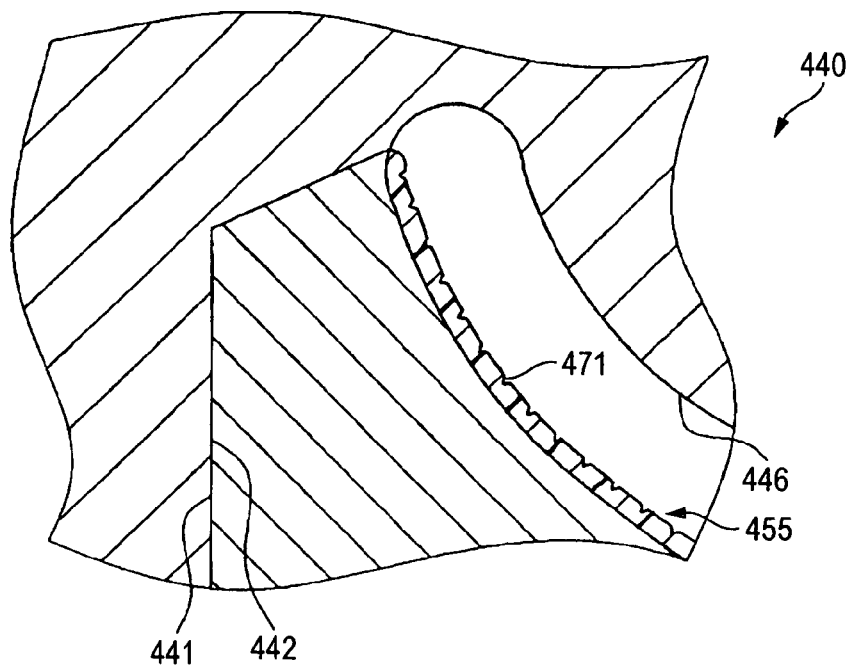
FIGS. 32A, 32B illustrate partial sectional views showing mold apparatus in other example.
Figure 32B:
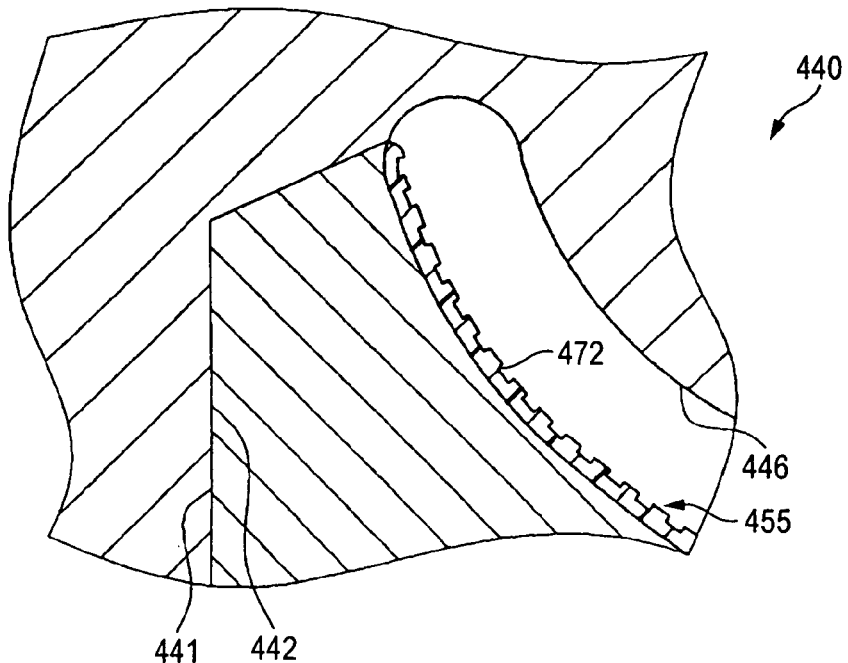

(g) Although not particularly referred to in the above-described embodiment, as shown by FIGS. 32A, 32B, there may be provided a plurality of rows of groove portions 471 having a section substantially in a V-like shape or recess portions 472 for forming thin-walled portions, for example, on a side of one face of the PE sheet 455 for forming the vehicle interior side sliding layer 428 for the door glass sliding face of the vehicle interior side seal lip 413 constituting a bent face. In this case, the PE sheet 455 can smoothly be deformed from the molding face of the mold constituting the cavity 446 (for example, first mold 441). Therefore, the PE sheet 455 and the mold face can be brought into close contact with each other comparatively easily and further firmly, the fabrication operability can be promoted and the product quality can be promoted. Further, similar operation and effect are achieved by also forming the groove portion or the recess portion at the PE sheet for forming the vehicle exterior side sliding layer 427 for the vehicle exterior side seal lip 412.

Further, as shown by FIGS. 32A, 32B, the PE sheet is set such that the formed face of the groove portion 471 or the recess portion 472 is directed to an inner peripheral side of the cavity 446, and therefore, a surface area of a face of the PE sheet 455 on a side of being embedded in the vehicle interior side molded member 422 is increased and the PE sheet 455 can further solidly be bonded to the vehicle interior side molded member 422. Further, also with regard to the PE sheet 456 for forming the base portion side sliding layer 429, similar operation and effect are achieved by forming the groove portion or the recess portion and installing the formed face to direct to the inner peripheral side of the corresponding cavity in molding.

What is claimed is:

1. A glass run comprising:
   a main body portion configured to attach to an attaching portion provided along an inner periphery of a door frame of a vehicle, the main body portion comprising a bottom portion and a vehicle interior side wall portion and a vehicle exterior side wall portion extended from the bottom portion and forming a section substantially in a U-shape; and
   a vehicle interior side seal lip and a vehicle exterior side seal lip extended from substantially a tip end of the vehicle interior side wall portion and a tip end of the vehicle exterior side wall portion to an inner side of the main body portion,
   wherein the glass run includes a vehicle interior side molded portion including at least the vehicle interior side seal lip and the vehicle interior side wall portion, and a vehicle exterior side molded portion including at least the vehicle exterior side seal lip, the vehicle exterior side wall portion and a connecting portion,
   wherein an entire region in a longitudinal direction comprising an upper side portion in correspondence with an upper edge portion of a door glass and a front vertical side portion and a rear vertical side portion in correspondence with a front edge portion and a rear edge portion of the door glass,
   wherein a portion in correspondence with the bottom portion comprises the connecting portion connecting the vehicle interior side molded portion and the vehicle exterior side molded portion, and elongatable and contractable in a vehicle inner and outer direction, and
   wherein the connecting portion is formed by a section substantially in a V-shape in a state that the connecting portion is elongated and the connecting portion is formed by a section substantially in an I-shape in a state that the connecting portion is contracted, and
   wherein the vehicle interior side molded portion, the vehicle exterior side molded portion, and the connecting portion are integrally formed by molding.

2. The glass run according to claim 1, wherein the connecting portion is partially or intermittently provided in the longitudinal direction of the vehicle interior side molded portion and the vehicle exterior side molded portion.

3. The glass run according to claim 1, wherein the connecting portion includes a first variable portion extended outward from a tip end portion of a vehicle exterior side portion of the bottom portion and a second variable portion extended outward from a tip end portion of a vehicle interior side portion of the bottom portion and connected to a tip end of the first variable portion opposite the tip end portion of the vehicle exterior side portion of the bottom portion.

4. The glass run according to claim 1, wherein the connecting portion is convex to an inner peripheral side of the bottom portion.

5. The glass run according to claim 3, wherein a wall thickness of the first variable portion is greater than a wall thickness of the second variable portion.

* * * * *